US012381660B2

(12) United States Patent
Wang

(10) Patent No.: US 12,381,660 B2
(45) Date of Patent: Aug. 5, 2025

(54) TRANSPORT BLOCK REPETITION WITH MULTIPLE UPLINK CONFIGURED GRANT CONFIGURATIONS

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 17/793,084

(22) PCT Filed: Jan. 22, 2021

(86) PCT No.: PCT/EP2021/051461
§ 371 (c)(1),
(2) Date: Jul. 15, 2022

(87) PCT Pub. No.: WO2021/151793
PCT Pub. Date: Aug. 5, 2021

(65) Prior Publication Data
US 2023/0039648 A1     Feb. 9, 2023

Related U.S. Application Data

(60) Provisional application No. 62/968,195, filed on Jan. 31, 2020.

(51) Int. Cl.
*H04L 1/1812* (2023.01)
*H04L 1/1867* (2023.01)
*H04W 72/23* (2023.01)

(52) U.S. Cl.
CPC ............ *H04L 1/1819* (2013.01); *H04L 1/188* (2013.01); *H04L 1/1887* (2013.01); *H04W 72/23* (2023.01)

(58) Field of Classification Search
CPC ..... H04L 1/1819; H04L 1/1822; H04L 1/188; H04L 1/1887; H04L 1/189; H04W 72/23
See application file for complete search history.

(56) References Cited

U.S. PATENT DOCUMENTS 10,813,124 B2 * 10/2020 Cao ................. H04W 74/02
10,869,333 B2 * 12/2020 Cao ............... H04W 72/1268
(Continued)

FOREIGN PATENT DOCUMENTS

CA    3149831 A1 * 2/2021 ........... H04L 1/1812
CN    109391374 A * 2/2019 ............... H04L 1/00
(Continued)

OTHER PUBLICATIONS

"3GPP TS 38.211 V16.0.0", 3rd Generation Partnership Project; Technical Specification Group Radio Access Network; NR; Physical channels and modulation (Release 16), Dec. 2019, pp. 1-129.
(Continued)

*Primary Examiner* — Eric Nowlin
(74) *Attorney, Agent, or Firm* — Sage Patent Group

(57) ABSTRACT

The invention refers to a method, performed by a user equipment, UE, for transmitting data based on a plurality of configured grants, CGs, of resources of a wireless network, the method comprising: receiving, from a network node serving the UE, configurations of a plurality of CGs of resources allocated for the UE to transmit data; transmitting, to the network node, an initial transmission of a transport block, TB, of data using first resources associated with a first one of the CGs, wherein the first CG supports a plurality of repetitions of a single TB; selecting second resources associated with a second one of the CGs for transmission of a subsequent repetition of the TB; and transmitting, to the network node, the subsequent TB repetition using the second resources associated with the second CG; the invention
(Continued)

further refers to a method in a corresponding network node and to a corresponding UE and a network node respectively.

21 Claims, 7 Drawing Sheets

(56) References Cited

U.S. PATENT DOCUMENTS

| | | | | |
|---|---|---|---|---|
| 11,122,612 | B2* | 9/2021 | Jeon | H04W 72/23 |
| 11,139,928 | B2* | 10/2021 | Jechoux | H04L 5/0007 |
| 11,265,910 | B2* | 3/2022 | Babaei | H04W 74/0808 |
| 11,330,443 | B2* | 5/2022 | Babaei | H04W 72/0466 |
| 11,540,312 | B2* | 12/2022 | Al-Imari | H04W 74/0833 |
| 11,716,175 | B2* | 8/2023 | Deogun | H04L 1/1887 |
| | | | | 370/329 |
| 12,003,328 | B2* | 6/2024 | Lei | H04L 1/1812 |
| 12,150,140 | B2* | 11/2024 | Takeda | H04L 5/0053 |
| 2018/0176945 | A1* | 6/2018 | Cao | H04L 1/1877 |
| 2018/0368175 | A1* | 12/2018 | Jeon | H04W 72/04 |
| 2019/0068317 | A1* | 2/2019 | Babaei | H04L 1/1812 |
| 2019/0068331 | A1* | 2/2019 | Lee | H04L 1/1861 |
| 2019/0090269 | A1* | 3/2019 | Cao | H04L 1/1893 |
| 2020/0100279 | A1* | 3/2020 | Al-Imari | H04L 5/0073 |
| 2020/0177326 | A1* | 6/2020 | Jechoux | H04L 1/1819 |
| 2020/0221310 | A1* | 7/2020 | Babaei | H04L 1/1671 |
| 2020/0229227 | A1* | 7/2020 | Babaei | H04W 76/11 |
| 2020/0229229 | A1* | 7/2020 | Chen | H04L 1/08 |
| 2021/0045181 | A1* | 2/2021 | Li | H04W 72/23 |
| 2021/0204313 | A1* | 7/2021 | Takeda | H04W 72/115 |
| 2021/0266112 | A1* | 8/2021 | Deogun | H04L 1/1819 |
| 2022/0052790 | A1* | 2/2022 | Lei | H04L 5/0053 |
| 2022/0070910 | A1* | 3/2022 | Li | H04W 72/23 |
| 2022/0116152 | A1* | 4/2022 | Iyer | H04L 1/1896 |
| 2022/0201732 | A1* | 6/2022 | Takeda | H04W 72/23 |
| 2022/0294572 | A1* | 9/2022 | Wu | H04L 1/1812 |
| 2023/0025815 | A1* | 1/2023 | Lee | H04L 1/1874 |
| 2023/0039648 | A1* | 2/2023 | Wang | H04L 1/1887 |
| 2023/0180276 | A1* | 6/2023 | Gerami | H04W 72/02 |
| | | | | 370/329 |
| 2024/0089953 | A1* | 3/2024 | Takahashi | H04W 72/1268 |
| 2024/0259163 | A1* | 8/2024 | Singh | H04L 1/1861 |

FOREIGN PATENT DOCUMENTS

| | | | | |
|---|---|---|---|---|
| CN | 109391374 B | * | 8/2020 | H04L 1/00 |
| CN | 112602280 A | * | 4/2021 | H04L 1/1614 |
| CN | 115918197 A | * | 4/2023 | H04B 7/022 |
| CN | 112602280 B | * | 10/2024 | H04L 1/1614 |
| EP | 3664339 A1 | * | 6/2020 | H04L 1/00 |
| WO | WO-2019024890 A1 | * | 2/2019 | H04L 1/00 |
| WO | WO-2020033689 A1 | * | 2/2020 | H04L 1/1614 |
| WO | WO-2020226725 A1 | * | 11/2020 | H04L 1/1812 |
| WO | WO-2021022532 A1 | * | 2/2021 | H04L 1/1812 |
| WO | WO-2021141401 A1 | * | 7/2021 | H04L 1/08 |
| WO | WO-2021151793 A1 | * | 8/2021 | H04L 1/1819 |
| WO | WO-2021208075 A1 | * | 10/2021 | |
| WO | WO-2022029698 A1 | * | 2/2022 | H04L 1/1614 |

OTHER PUBLICATIONS

"3GPP TS 38.214 V15.0.0", 3rd Generation Partnership Project; Technical Specification Group Radio Access Network; NR; Physical layer procedures for data (Release 15), Dec. 2017, pp. 1-71.

"3GPP Ts 38.401 V15.7.0", 3rd Generation Partnership Project; Technical Specification Group Radio Access Network; NG-RAN; Architecture description (Release 15), Dec. 2019, pp. 1-47.

"Remaining issues on Configured Grant", 3GPP TSG-RAN WG2 Meeting #108, Tdoc R2-1915867, Revision of R2-1913501, Reno, U.S., Nov. 18-22, 2019, pp. 1-11.

"3GPP TS 38.213 V16.0.0", 3rd Generation Partnership Project; Technical Specification Group Radio Access Network; NR; Physical layer procedures for control (Release 16), Dec. 2019, pp. 1-146.

"3GPP TS 38.321 V15.4.0", 3rd Generation Partnership Project; Technical Specification Group Radio Access Network; NR; Medium Access Control (MAC) protocol specification (Release 15), Dec. 2018, pp. 1-77.

"3GPP TS 38.331 V15.6.0", 3rd Generation Partnership Project; Technical Specification Group Radio Access Network; NR; Radio Resource Control (RRC) protocol specification (Release 15), Jun. 2019, pp. 1-519.

"3GPP TR 38.889 V16.0.0", 3rd Generation Partnership Project; Technical Specification Group Radio Access Network; Study on NR-based access to unlicensed spectrum (Release 16), Dec. 2018, pp. 1-119.

"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

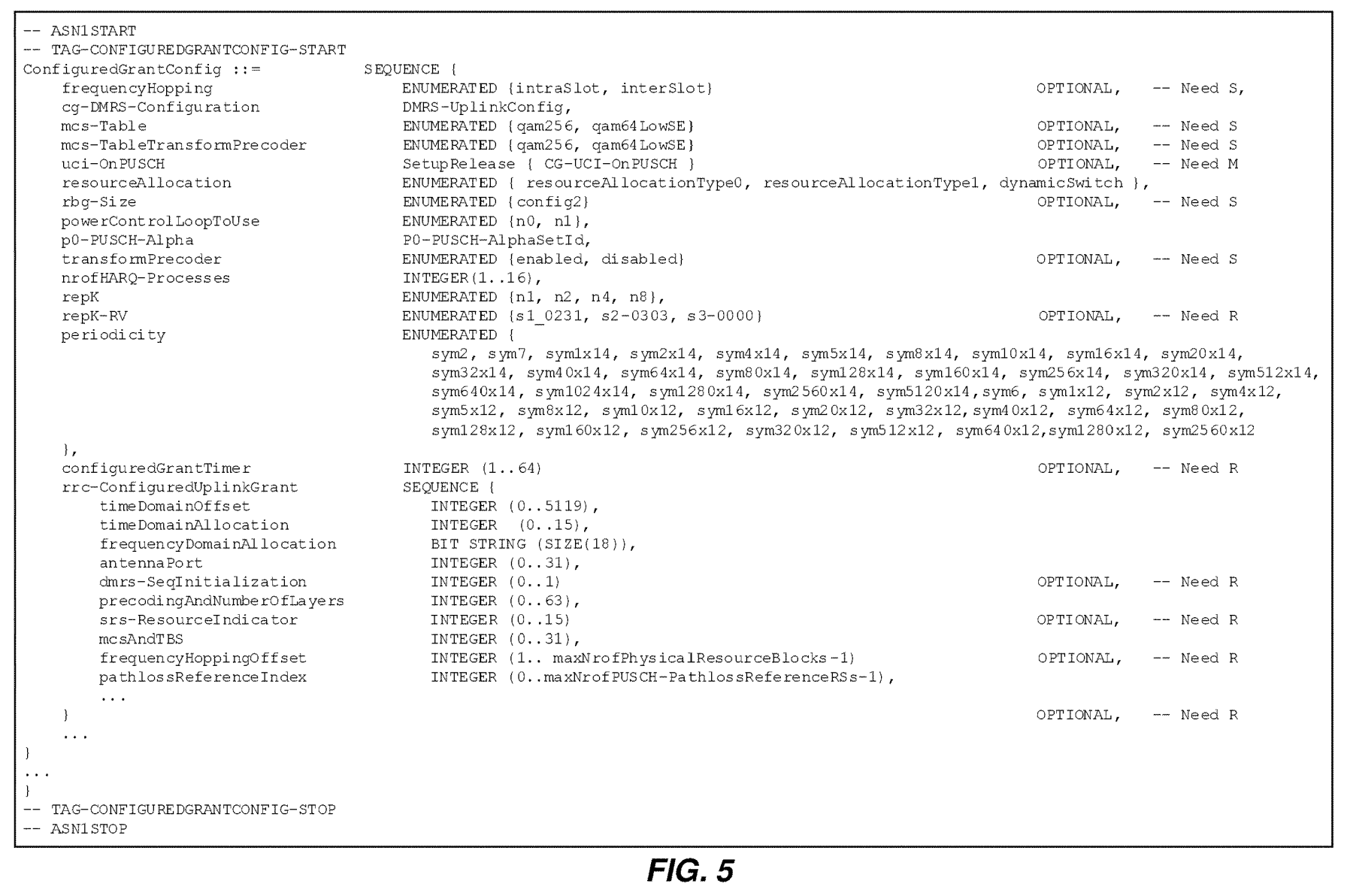

```
-- ASN1START
-- TAG-CONFIGUREDGRANTCONFIG-START
ConfiguredGrantConfig ::=        SEQUENCE {
    frequencyHopping                 ENUMERATED {intraSlot, interSlot}                                    OPTIONAL,   -- Need S,
    cg-DMRS-Configuration            DMRS-UplinkConfig,
    mcs-Table                        ENUMERATED {qam256, qam64LowSE}                                      OPTIONAL,   -- Need S
    mcs-TableTransformPrecoder       ENUMERATED {qam256, qam64LowSE}                                      OPTIONAL,   -- Need S
    uci-OnPUSCH                      SetupRelease { CG-UCI-OnPUSCH }                                      OPTIONAL,   -- Need M
    resourceAllocation               ENUMERATED { resourceAllocationType0, resourceAllocationType1, dynamicSwitch },
    rbg-Size                         ENUMERATED {config2}                                                 OPTIONAL,   -- Need S
    powerControlLoopToUse            ENUMERATED {n0, n1},
    p0-PUSCH-Alpha                   P0-PUSCH-AlphaSetId,
    transformPrecoder                ENUMERATED {enabled, disabled}                                       OPTIONAL,   -- Need S
    nrofHARQ-Processes               INTEGER(1..16),
    repK                             ENUMERATED {n1, n2, n4, n8},
    repK-RV                          ENUMERATED {s1_0231, s2-0303, s3-0000}                               OPTIONAL,   -- Need R
    periodicity                      ENUMERATED {
            sym2, sym7, sym1x14, sym2x14, sym4x14, sym5x14, sym8x14, sym10x14, sym16x14, sym20x14,
            sym32x14, sym40x14, sym64x14, sym80x14, sym128x14, sym160x14, sym256x14, sym320x14, sym512x14,
            sym640x14, sym1024x14, sym1280x14, sym2560x14, sym5120x14, sym6, sym1x12, sym2x12, sym4x12,
            sym5x12, sym8x12, sym10x12, sym16x12, sym20x12, sym32x12, sym40x12, sym64x12, sym80x12,
            sym128x12, sym160x12, sym256x12, sym320x12, sym512x12, sym640x12, sym1280x12, sym2560x12}
    },
    configuredGrantTimer             INTEGER (1..64)                                                      OPTIONAL,   -- Need R
    rrc-ConfiguredUplinkGrant        SEQUENCE {
        timeDomainOffset                 INTEGER (0..5119),
        timeDomainAllocation             INTEGER (0..15),
        frequencyDomainAllocation        BIT STRING (SIZE(18)),
        antennaPort                      INTEGER (0..31),
        dmrs-SeqInitialization           INTEGER (0..1)                                                   OPTIONAL,   -- Need R
        precodingAndNumberOfLayers       INTEGER (0..63),
        srs-ResourceIndicator            INTEGER (0..15)                                                  OPTIONAL,   -- Need R
        mcsAndTBS                        INTEGER (0..31),
        frequencyHoppingOffset           INTEGER (1..maxNrofPhysicalResourceBlocks-1)                     OPTIONAL,   -- Need R
        pathlossReferenceIndex           INTEGER (0..maxNrofPUSCH-PathlossReferenceRSs-1),
        ...
    }
    ...
}
-- TAG-CONFIGUREDGRANTCONFIG-STOP
-- ASN1STOP
```

FIG. 5

TRANSPORT BLOCK REPETITION WITH MULTIPLE UPLINK CONFIGURED GRANT CONFIGURATIONS

TECHNICAL FIELD

Embodiments of the present disclosure generally relate to wireless communication networks, and particularly relates to improving the transmission and/or reception of data in configured grant configurations.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communication (MTC), ultra-reliable low latency communications (URLLC), side-link device-to-device (D2D), and several other use cases, too. The present disclosure relates generally to NR, but the following description of previous-generation technology is provided for context since it shares many features with NR.

Long Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 1 shows an exemplary radio frame structure for LTE FDD downlink (DL) operation. The radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary downlink slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as shown in FIG. 1, but comprises $N^{UL}_{symb}$ OFDM symbols, each of which is comprised of $N_{sc}$ OFDM subcarriers.

As shown in FIG. 1, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz SCS) or 24 (7.5-kHz SCS). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY downlink comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs. The configuration of 15-kHz SCS and "normal" CP is often referred as the numerology, μ.

An exemplary LTE FDD UL radio frame can be configured in a similar manner as the exemplary FDD DL radio frame shown in FIG. 1. Using terminology consistent with the above DL description, each UL slot consists of $N^{UL}_{symb}$ OFDM symbols, each of which is comprised of $N_{sc}$ OFDM subcarriers.

Generally speaking, an LTE physical channel corresponds to a set of resource elements (e.g., as shown in FIG. 1) carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Logical channels reside between RLC and MAC layers in the LTE protocol stack. In general, logical channels are associated with the type of information being transferred. They can be broadly divided into control channels for the transfer of control plane information and traffic channels for the transfer of user plane information. Each logical channel is mapped to one or more transport channels, which are mapped to various physical channels discussed above.

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions. In general, when referring to an UL transmission without an explicit grant as a "configured grant transmission," this term can include all types of pre-configured transmission patterns, including both SPS and grant-free operation.

While LTE was primarily designed for user-to-user communications, 5G/NR networks are envisioned to support high single-user data rates (e.g., 1 Gb/s) and large-scale, machine-to-machine communication involving short, bursty transmissions from many devices that share the frequency bandwidth. For example, URLLC (Ultra-Reliable Low Latency Communication) is intended to provide a data service with extremely strict error and latency requirements, e.g., error probabilities as low as $10^{-5}$ or lower and 1 ms (or less) end-to-end latency. In NR Rel-15, several new features and enhancements were introduced to support the strict error and latency requirements of URLLC. This includes configured scheduling schemes used to allocate semi-static periodic assignments or grants for a UE, similar to the configured scheduling schemes for LTE described above.

For NR UL, there are two types of configured grants. Type-1 configured grants are configured via radio resource control (RRC) signaling only. In contrast, for Type-2, some parameters are preconfigured via RRC signaling and some PHY parameters are configured via MAC scheduling. The RRC configuration of a NR UL configured grant includes various parameters, including a configuredGrantTimer value that is used for controlling operation of hybrid ARQ (HARD) processes in the UL via a controlled grant timer ("CG timer") in the UE. Detailed procedures can be found in 3GPP TS 38.321 V15.4.0.

Autonomous Uplink (AUL) is also being developed for NR Rel-16, based on the configured UL grant scheme in Rel-15. AUL is intended to support autonomous HARQ retransmission using a configured grant. In this arrangement, a new UE timer (referred to as "CGretransmissionTimer") is needed to protect the HARQ procedure so that the retransmission can use the same HARQ process for both transmission and retransmission of a transport block (TB) of UL data.

More specifically, a UE can use the configuredGrantTimer to limit the maximum retransmission attempts for a TB using a configured grant if the UE supports autonomous HARQ retransmissions for the TB using configured grants (i.e., cgRetransmissionTimer is configured). However, a UE can be configured with multiple active CG configurations, and the mapping between logical channels (LCHs) and the UE's active CG configurations can be one-to-many or many-to-many. This can create various problems, issues, and/or drawbacks in relation to transmission of repetitions of a single TB using configured UL grants.

SUMMARY

Accordingly, embodiments of the present disclosure address at least some of the above-described issues, drawbacks, and/problems of current solutions by providing flexible techniques for allocating UL configured grants and other semi-persistent resources to UEs, e.g. operating in a cell, while avoiding excess UE complexity and energy consumption.

Such embodiments include a method for transmitting data based on a plurality of configured grants (CGs) of resources (e.g. in a cell) of a wireless network. These methods are being performed by a user equipment (UE, e.g., wireless device, IoT device, MTC device, etc. or component thereof) configured to operate in the wireless network (e.g., NG-RAN, E-UTRAN): to receiving, from a network node serving the UE, configurations of a plurality of CGs of resources allocated for the UE to transmit data to the network node (e.g. within/to a cell served by the network node), and transmitting, to the network node, an initial transmission of a transport block (TB) of data using first resources associated with a first one of the CGs, wherein the first CG supports a plurality of repetitions of a single TB, selecting second resources associated with a second one of the CGs for transmission of a subsequent repetition of the TB, and transmitting, to the network node, the subsequent TB repetition using the second resources associated with the second CG.

In some embodiments, the UE can be configured with a plurality of logical channels (LCHs), with each LCH being mapped to one or more of the CGs. In such embodiments, one or more of the LCHs can be multiplexed into the TB.

In some embodiments, these method can also include, in response to transmitting the initial TB transmission, starting a first timer for a hybrid ARQ (HARQ) process associated with the TB. The first timer can be started using a value associated with the first CG. For example, the first timer can be a configuredGrantTimer and can be started using a corresponding value in the ConfiguredGrantConfig associated with the first CG.

In some embodiments, these exemplary methods can also include, in response to transmitting the initial TB transmission, starting a second timer for the HARQ process associated with the TB. The second timer can be started using a value associated with the first CG. For example, the second timer can be a cgRetransmissionTimer and can be started using a corresponding value in the ConfiguredGrantConfig associated with the first CG.

In some embodiments, the usage of the second resources is made dependent on that not any of the following information/condition applies:
- a hybrid ARQ (HARQ) acknowledgement (ACK or NACK) of the TB, and
- a resource grant for a new transmission associated with an HARQ process that is also associated with the initial TB transmission Alternatively or additionally, the usage of the second resources is made dependent on that not any of the following information/condition applies:
- a maximum number of repetitions of the TB, including the initial TB transmission, has been reached, and an
- expiration of a timer corresponding to a maximum number of autonomous retransmissions for an HARQ process associated with the initial TB transmission.

In some embodiments, the selecting operations can include selecting the second CG based on one or more of the following rules and/or conditions:
- the same as the first CG;
- a CG having second resources available earliest in time for the subsequent TB repetition;
- a CG mapped to LCHs that are multiplexed into the TB;
- a CG having second resources that can provide the highest transmission reliability among the plurality of CGs;
- a CG having second resources that can provide the shortest transmission delay among the plurality of CGs;
- a CG having second resources that support a TB size (TBS) used to transmit the initial TB transmission using the first resources; and
- a CG having second resources associated with a HARQ process that is also associated with the initial TB transmission.

In some embodiments, the second resources associated with the second CG do not support a plurality of repetitions of a single TB.

In some embodiments, the initial TB transmission can be associated with a first HARQ process and the subsequent TB repetition can be associated with a second (i.e., different) HARQ process. In such embodiments, these exemplary methods can include copying the TB from the first HARQ process to the second ARQ process, and subsequently deleting the TB from the first HARQ process.

Further embodiments include transmitting, to the network node, the subsequent TB repetition using the second resources associated with the second CG (e.g., as selected). In some embodiments, the first CG includes a first redundancy version (RV) sequence for a plurality of TB repetitions. In such embodiments, transmitting the subsequent TB repetition can be further based on the first RV sequence of the first CG.

In some embodiments, these exemplary methods can also include performing one of the following operations in response to transmitting the subsequent TB repetition: allow the first timer to continue to run without interruption, or restart the first timer using a value associated with the second CG minus an elapsed time since transmitting the initial TB transmission.

In some embodiments, these exemplary methods can also include performing one of the following operations in response to transmitting the subsequent TB repetition: refrain from restarting the second timer, restart the second timer using a value associated with the second CG, or restart the second timer using a value associated with the first CG.

In some embodiments, the second timer is not started in response to the initial TB transmission. In these embodiments, the operations performed in response to transmitting the subsequent TB repetition can include an additional option. More specifically, when the subsequent TB repetition is a final repetition of the TB, the UE can start the second timer for the HARQ process associated with the TB. The UE can start the second timer using a value associated with the first CG or with the second CG.

Other embodiments include methods (e.g., procedures) for receiving data from a user equipment (UE) based on a plurality of configured grants (CGs) of resources of a wireless network. These exemplary methods are performed by a network node (e.g., base station, eNB, gNB, or components thereof) in the wireless network (e.g., NG-RAN, E-UTRAN), and comprise; transmitting, to the UE, configurations of a plurality of CGs of resources allocated for the UE to transmit data to the network node, e.g. within a cell served by the network node, receiving, from the UE, an initial transmission of a transport block, TB, of data using first resources associated with a first one of the CGs, wherein the first CG supports a plurality of repetitions of a single TB, and selectively receiving, from the UE, a subsequent repetition of the TB using second resources associated with a second one of the CGs.

In some embodiments, the UE can be configured with a plurality of logical channels (LCHs), with each LCH being mapped to one or more of the CGs. In such embodiments, one or more of the LCHs can be multiplexed into the TB for which an initial repetition was received.

In some embodiments, the first CG can include a first redundancy version (RV) sequence for a plurality of TB repetitions. In such embodiments, receiving the subsequent TB repetition can be further based on the first RV sequence of the first CG.

In some embodiments, these exemplary methods can also include transmitting, to the UE, one or more of the following information after receiving the initial TB transmission:
- a hybrid ARQ (HARQ) acknowledgement (ACK or NACK) of the TB, and/or
- a resource grant for a new transmission associated with a HARQ process that is also associated with the initial TB transmission.

In such embodiments, the subsequent TB repetition is not received after transmitting the above information, after receiving the initial TB transmission.

In some embodiments, the second CG is one of the following:
- the same as the first CG;
- a CG having second resources available earliest in time for the subsequent TB repetition;
- a CG mapped to LCHs that are multiplexed into the TB;
- a CG having second resources that can provide the highest transmission reliability among the plurality of CGs;
- a CG having second resources that can provide the shortest transmission delay among the plurality of CGs;
- a CG having second resources that support a TB size (TBS) used to transmit the initial TB transmission using the first resources; and
- a CG having second resources associated with a HARQ process that is also associated with the initial TB transmission.

In some embodiments, the second resources associated with the second CG do not support a plurality of repetitions of a single TB.

In some embodiments, the initial TB transmission can be associated with a first HARQ process and the subsequent TB repetition can be associated with a second (i.e., different) HARQ process.

Other exemplary embodiments include user equipment (UEs, e.g., wireless devices, IoT devices, etc., or components thereof) and network nodes (e.g., base stations, gNBs, eNBs, etc., or components thereof) configured to perform operations corresponding to any of the exemplary methods described herein. Exemplary embodiments also include non-transitory, computer-readable media storing computer-executable instructions that, when executed by processing circuitry, configure such UEs or network nodes to perform operations corresponding to any of the exemplary methods described herein. Exemplary embodiments also include computer program products that include such executable instructions.

These and other objects, features, and advantages of the present disclosure will become apparent upon reading the following Detailed Description in view of the Drawings briefly described below.

BRIEF DESCRIPTION OF THE DRAWINGS

FIG. 5 shows an exemplary ASN.1 data structure for a ConfiguredGrantConfig Radio Resource Control (RRC) Information Element (IE), according to various exemplary embodiments of the present disclosure.

DETAILED DESCRIPTION

Figure 1:
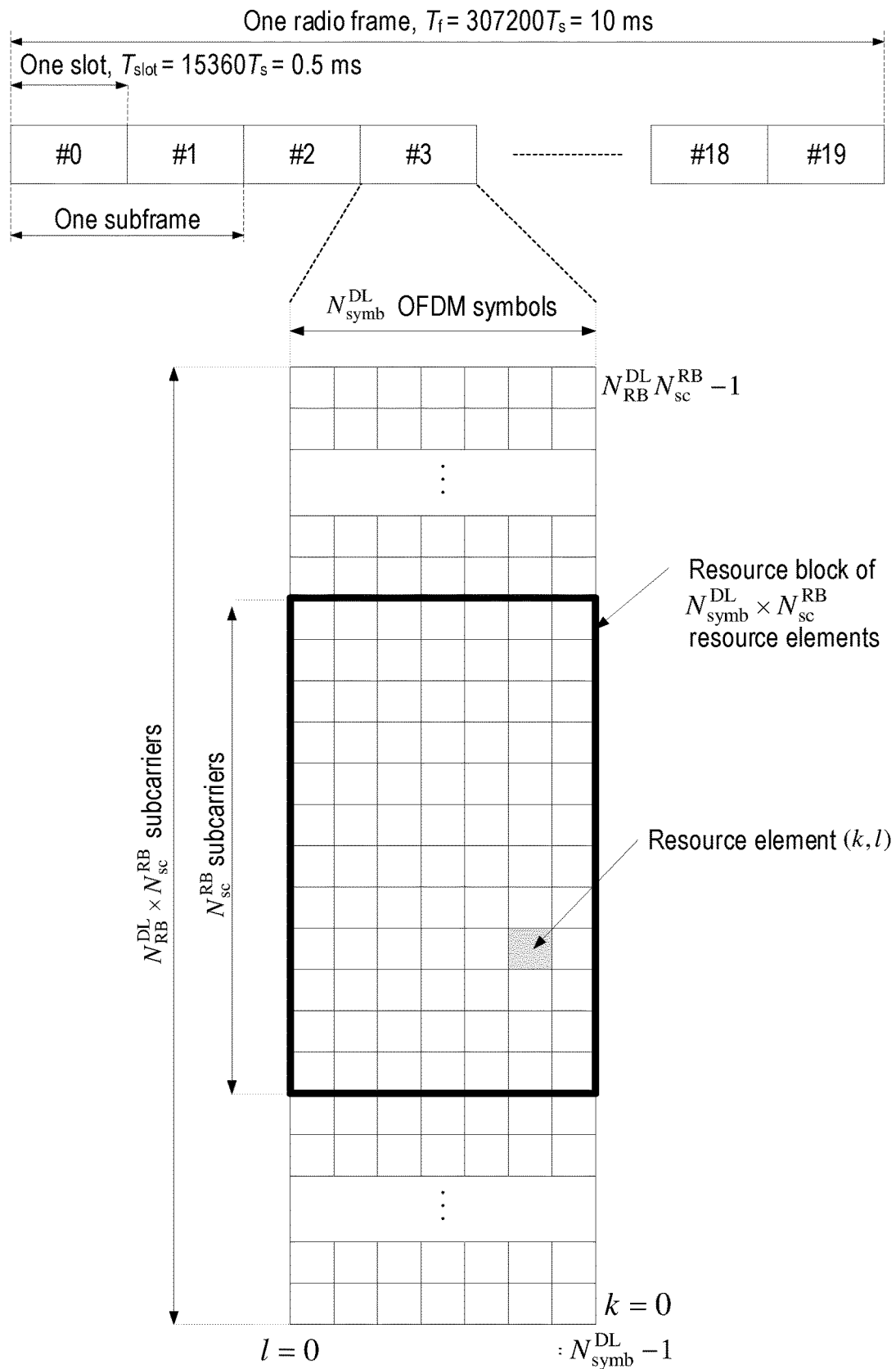
FIG. 1 is a block diagram of exemplary downlink and uplink LTE radio frame structures used for frequency division duplexing (FDD) operation.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, an NR UE can use configuredGrantTimer to limit the maximum retransmission attempts for a transport block (TB) using a configured grant if the UE supports autonomous HARQ retransmissions for the TB using configured grants (i.e., CGretransmissionTimer is configured). However, a UE can be configured with multiple active CG configurations, and the mapping between logical channels (LCHs) and the UE's active CG configurations can be one-to-many or many-to-many. This can create various problems, issues, and/or drawbacks in relation to transmission of repetitions of a single TB using configured UL grants. This is discussed in greater detail below.

NR shares many similarities with LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some similar properties as the suspended condition for LTE.

Various physical channels are also defined for 5G/NR. In general, the NR physical channels are very similar to corresponding LTE physical channels with identical or substantially similar names. Also similar to LTE, an NR physical channel corresponds to a set of resource elements carrying information originating from higher layers.

In addition to providing coverage via "cells," as in previous generations, NR networks will also provide coverage via "beams." As used herein, "beam" refers to a coverage area of a reference signal that may be measured by a UE. In NR, for example, such reference signals can include any of the following, alone or in combination: SS/PBCH block (SSB), channel state information reference signal (CSI-RS), tertiary reference signals (or any other sync signal), positioning RS (PRS), demodulation RS (DMRS), etc.

Figure 2:
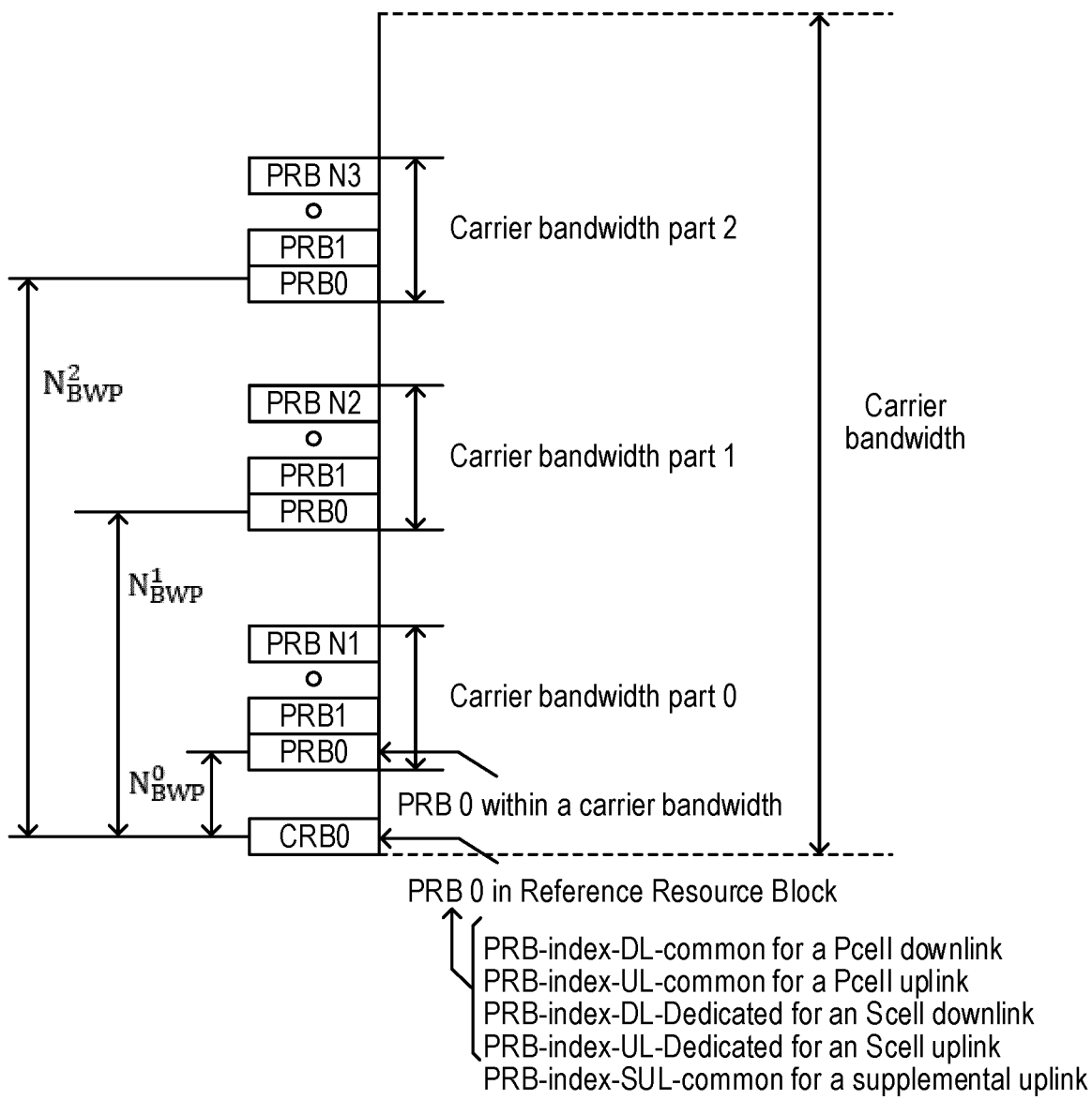
FIG. 2 shows an exemplary frequency-domain configuration for a 5G/New Radio NR) user equipment (UE).

FIG. 2 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15 \times 2^\mu)$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The slot length is inversely related to SCS or numerology according to $\frac{1}{2^\mu}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\mu * 180$ kHz.

Table 1 below summarizes the supported NR numerologies and associated parameters. Different DL and UL numerologies can be configured by the network.

TABLE 1

| μ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

Figure 3:
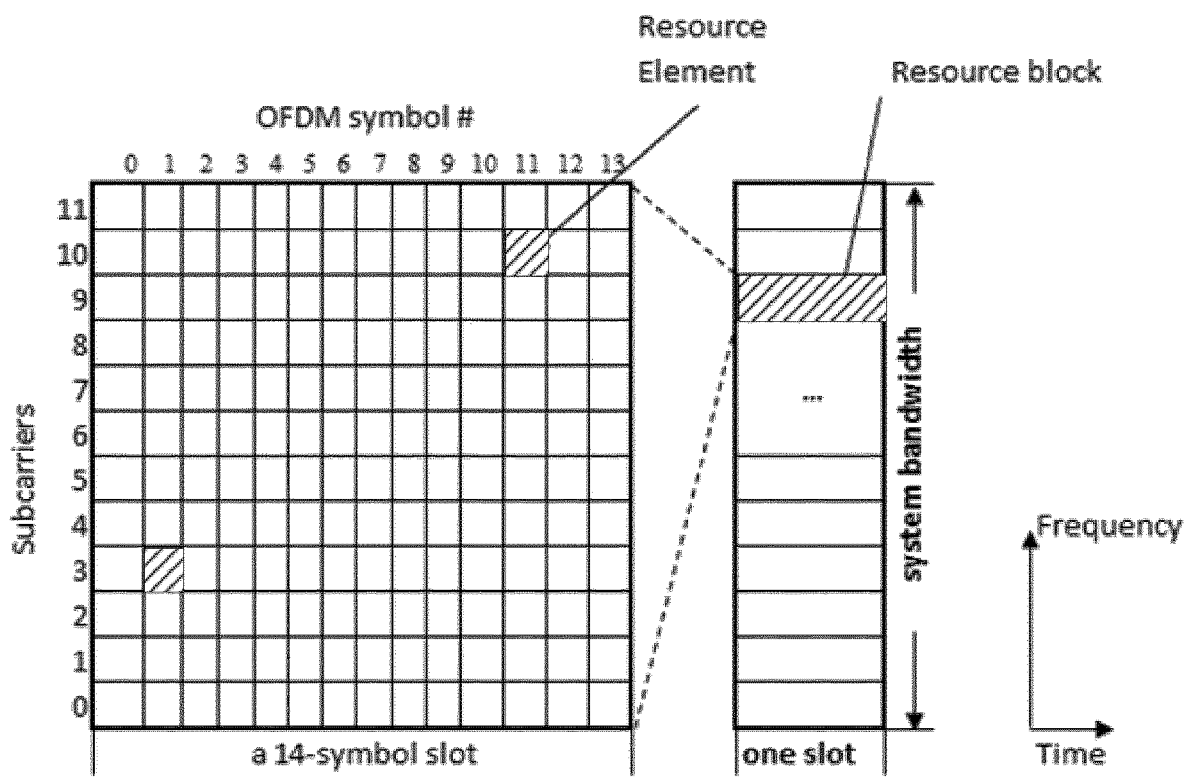
FIG. 3 shows an exemplary time-frequency resource grid for an NR slot.

FIG. 3 shows an exemplary time-frequency resource grid for an NR slot. As illustrated in FIG. 3, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix (e.g., as shown in FIG. 3) and 12 symbols for extended cyclic prefix.

Figure 4A:
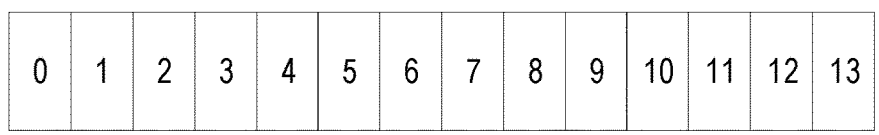
FIGS. 4A-4B show various exemplary NR slot configurations.

FIG. 4A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 4B:
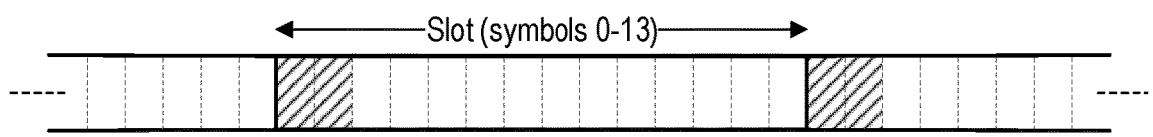

FIG. 4B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 5B, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe. In NR, however, each REG consists of all 12 REs of one OFDM symbol in a RB, whereas an LTE REG includes only four REs. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such DCI formats 0_1/1_1 are intended for scheduling a single TB transmission with limited flexibility. On the other hand, the non-fallback DCI formats can provide flexible TB scheduling with multi-layer transmission.

New DCI formats introduced in NR Rel-16 provide similar functionality as the Rel-15 non-fallback formats but with a higher degree of configurability. In the discussion below, the new DCI formats are referred to as DCI format 0_b for scheduling UL transmission, and DCI format 1_a for scheduling DL transmission, where 'a' and 'b' are generic symbols and can be replaced by integers, e.g., a=b=2. The new DCI formats 0_b/1_a can be used for UL and DL dynamic scheduling as well as activating UL configured grant (CG) type 2 and DL semi-persistent scheduling (SPS) transmissions.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (v) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2.

NR targets operation in both licensed and unlicensed bands, and a work item named NR-based Access to Unlicensed Spectrum (NR-U) was started in January 2019. Allowing unlicensed networks (i.e., networks that operate in spectrum not licensed to the operator such that it must be shared) to effectively use available spectrum is an attractive approach to increase system capacity. Although unlicensed spectrum does not match the quality of licensed (e.g., unshared) spectrum, solutions that allow an efficient use of it as a complement to licensed deployments have the potential to bring great value to the 3GPP operators, and, ultimately, to the 3GPP industry as a whole. It is expected that some features in NR will need to be adapted to comply with the special characteristics of the unlicensed band as well as also different regulations.

For a node to be allowed to transmit in unlicensed spectrum, it typically needs to perform a listen-before-talk (LBT) or a clear channel assessment (CCA). In general, the node or device performs LBT sensing in a particular channel (corresponding to a defined carrier frequency) and over a predefined bandwidth. For example, in the 5 GHz band, the sensing is done over 20-MHz channels. In general, the MAC layer initiates a transmission and requests the PHY layer to initiate the LBT procedure. After completion, the PHY layer indicates the LBT outcome (e.g., success or failure). This procedure can include sensing the medium as idle for a number of time intervals, which can be done in various ways including energy detection, preamble detection, or virtual carrier sensing.

In virtual carrier sensing, the node reads control information from other transmitting nodes informing when a transmission ends. After sensing the medium idle, a node is typically allowed to transmit for a certain amount of time, referred to as transmission opportunity (TXOP). The length of the TXOP depends on regulation and type of CCA that has been performed, but typically ranges from 1 ms to 10 ms.

In the energy detection (ED) technique used in NR-U, the transmitter looks for the energy level in channel over a time period compared to a certain threshold (ED threshold) in order to determine if the channel is idle or occupied/busy. If the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has gained access to a channel, the transmitter is only allowed to perform transmission up to a maximum time duration (i.e., maximum channel occupancy time, MCOT). For quality of service (QoS) differentiation, a channel access priority based on the service type has been defined. For example, four LBT priority classes are defined for differentiation of contention window sizes (CWS) and MCOT between services.

Some devices (e.g., UEs) may be capable of transmitting (and receiving) over a wide bandwidth including multiple sub-bands/channels. A device is only allowed to transmit on the sub-bands in which the medium is sensed as free. As with single bands, there are various ways LBT sensing should be done when multiple sub-bands are involved. In principle, there are two ways a device can operate over multiple sub-bands. One way is that the transmitter/receiver bandwidth is changed depending on which sub-bands that were sensed as free. In this setup, there is only one component carrier (CC) and the multiple sub-bands are treated as single channel with a larger bandwidth. The other way is that the device operates almost independent processing chains for each channel. Depending on how independent the processing chains are, this option can be referred to as either carrier aggregation (CA) or dual connectivity (DC).

License Assisted Access (LAA) is a feature of LTE that leverages the unlicensed 5 GHz band in combination with licensed spectrum to deliver a performance boost for mobile device users. It uses CA in the downlink to combine LTE in unlicensed 5-GHz band with LTE in the licensed band to provide better data rates and a better user experience. Since LAA operates in the 5-GHz band where Wi-Fi operates, it must be able to co-exist with Wi-Fi by avoiding channels that are being used by Wi-Fi users. LAA uses LBT to dynamically select a 5-GHz-band channel(s) that is(are) not being used—a "clear channel." If no clear channel is available, LAA will share a channel fairly with others. Further improvements to LTE LAA were standardized in Rel-15, with the resulting technology referred to generally as Further Enhanced LAA (feLAA).

In general, LTE LAA supports UE measurement reports for unlicensed spectrum based on measurements of averaged RSSI and channel occupancy (CO). In general, CO is defined as percentage of time that RSSI was measured above a configured threshold. For this purpose, a UE can be configured with a RSSI measurement timing configuration (RMTC) that includes a measurement duration (e.g., 1-5 ms) and a period between measurements (e.g. {40, 80, 160, 320, 640} ms). It has been agreed that NR-U should also support measurement of CO, with the LTE (fe)LAA CO rules serving as a baseline.

Configured UL scheduling (described above) will be also used in NR-U operation. For NR-U, the configured scheduling can improve the channel access probability for PUSCH transmission. This is because an additional LBT procedure for PDCCH transmission (e.g., per UL grant) is avoided and the UE can acquire channel for PUSCH transmission using a configured grant after the UE's successful LBT. In other words, a single LBT procedure is needed for each UL data transmission under a configured grant, whereas UL data transmission under a dynamic grant requires three LBT procedures—one for UE scheduling request (SR) transmission, a second for network PDCCH transmission containing UL grant, and a third for UE PUSCH transmission. This reduction in LBT activity can significantly improve a UE's channel access probability for PUSCH transmission, especially in more heavily loaded shared channels.

In general, a transmitter (e.g., a UE) can use hybrid ARQ (HARQ) techniques to improve reliability of data transmission. In HARQ, the transmitter can perform an initial transmission of a TB block of data, then perform one or more retransmissions of the same TB if the transmitter receives a negative acknowledgement (NACK)—or no response—from the receiver. In such cases, different redundancy versions (RVs) of the TB can be sent in the respective repetitions.

As described further in 3GPP TR 38.889, for both type-1 and type-2 CGs, the UE can only use a configured UL grant for an initial HARQ transmission of a TB. In contrast, HARQ retransmissions must obtain dynamic grants via PDCCH (e.g., addressed to CS-RNTI).

In NR Rel-15, it is desirable to introduce feLAA AUL type behavior; however, it is important to recognize that the baseline is type-1 and type-2 configured grants (CG). As such, enhancements may be needed over and above this baseline to enable the desired behavior. Like for SPS in LTE, the NR CG periodicity is RRC-configured, and is specified in the ConfiguredGrantConfig IE. Different periodicity values (P) are supported in NR Rel-15 depending on the subcarrier spacing. For example, the following periodicities are supported for 15 and 30 kHz SCS, expressed in a number of OFDM symbols:

15 kHz SCS: 2, 7, and n*14 OFDM symbols, where n∈{1, 2, 4, 5, 8, 10, 16, 20, 32, 40, 64, 80, 128, 160, 320, 640};

30 kHz SCS: 2, 7, and n*14 OFDM symbols, where n∈{1, 2, 4, 5, 8, 10, 16, 20, 32, 40, 64, 80, 128, 160, 256, 320, 640, 1280}.

For type-1 CGs, in addition to the periodicity, the time domain allocation of PUSCH is configured via RRC signalling according to the following parameters:

timeDomainOffset: a slot offset with respect to SFN 0; and timeDomainAllocation: an index into a table of 16 possible combinations of PUSCH mapping type (TypeA or TypeB), start symbol S for the mapping (S=OFDM symbol 0, 2, 4, or 8 within a slot), and length L of the mapping (L=4, 6, 8, 10, 12, or 14 OFDM symbols).

For the case of type-2 CGs, the periodicity is configured by RRC in the same way as for type-1, but the slot offset is dynamically indicated and is given by the slot in which the UE receives the DCI that activates the type-2 configured grant. In contrast to type-1, the time domain allocation of PUSCH is indicated dynamically via the time domain resource assignment (TDRA) field in DCI, in the same manner as dynamically-scheduled (non-CG) PUSCH. In particular, the TDRA field indexes a table of start symbol and length (SLIV) values.

FIG. 5 shows an exemplary ASN.1 data structure for a ConfiguredGrantConfig RRC information element (IE), including the fields mentioned above as being RRC-configured. The meaning and content of the respective fields shown in FIG. 5 are further defined in 3GPP TS 38.331 (v15.6.0).

Repetition of a TB is also supported in NR, and the same resource configuration is used for K repetitions for a TB including the initial transmission and K−1 retransmissions. The parameters repK and repK-RV shown in FIG. 5 define the K repetitions to be applied to the transmitted TB and the redundancy version (RV) pattern to be applied to the repetitions, respectively. In particular, the nth transmission occasion among K repetitions (n=1 ... K) is associated with the (mod(n−1,4)+1)th value in the configured RV sequence. The initial transmission of a transport block may start at one of the following:

the first transmission occasion of the K repetitions if the configured RV sequence is {0,2,3,1}, any of the transmission occasions of the K repetitions that are associated with RV=0 if the configured RV sequence is {0,3,0,3}, or any of the transmission occasions of the K repetitions if the configured RV sequence is {0,0,0,0}, except the last transmission occasion when K=8.

For any RV repetition sequence, the repetitions are terminated after the earliest of the following:

K repetitions;

the last transmission occasion among the K repetitions within P;

when a UL grant for scheduling the same TB is received within P; or when a DFI carrying a corresponding HARQ A/N is received.

The UE is not expected to be configured with a time duration for transmission of K repetitions larger than the time duration derived by the periodicity P.

For both type-1 and type-2 PUSCH transmissions with CG, when the UE is configured with repK>1, the UE shall repeat the TB across the repK consecutive slots applying the same symbol allocation in each slot. If the UE procedure for determining slot configuration (as defined in 3GPP TS 38.213 subclause 11.1) determines symbols of a slot allocated for PUSCH as DL symbols instead of UL symbols, the transmission on that slot is omitted for multi-slot PUSCH transmission.

As briefly mentioned above, Autonomous Uplink (AUL) is also being developed for NR Rel-16, based on the configured UL grant scheme in NR Rel-15. AUL is intended to support autonomous HARQ retransmission using a configured grant. However, the serving gNB can also schedule UE retransmission for a TB when an earlier CG transmission of the TB fails. In this autonomous arrangement, a new UE timer (referred to as "cgRetransmissionTimer") is used to protect the HARQ procedure so that the retransmission can use the same HARQ process for both transmission and retransmission of a transport block (TB) of UL data. The following points summarize current 3GPP RAN2 working group ("R2") agreements regarding these features:

R2 assumes that the configured grant timer is not started/restarted when configured grant is not transmitted due to LBT failure. PDU overwrite need to be avoided somehow.

The configured grant timer is not started/restarted when UL LBT fails on PUSCH transmission for grant received by PDCCH addressed to CS-RNTI scheduling retransmission for configured grant The configured grant timer is not started/restarted when the UL LBT fails on PUSCH transmission for UL grant received by PDCCH addressed to C-RNTI, which indicates the same HARQ process configured for configured uplink grant Retransmissions of a TB using configured grant resources, when initial transmission or a retransmission of the TB was previously done using dynamically scheduled resources, is not allowed A new timer ("CG retransmission timer") is introduced for auto retransmission (i.e. timer expiry=HARQ NACK) on configured grant for the case of the TB previous being transmitted on a configured grant.

The new timer is started when the TB is actually transmitted on the configured grant and stopped upon reception of HARQ feedback (DFI) or dynamic grant for the HARQ process.

The legacy CG timer and behaviour is kept to prevent a configured grant overriding the TB scheduled by dynamic grant, i.e. it is (re)started upon reception of the PDCCH as well as transmission on the PUSCH of dynamic grant.

In addition, the following agreements regarding configured grants (CGs) have been made within 3GPP RAN2 WG:

When configuredGrantTimer expires, the UE should stop the CGretransmission timer (CGRT) if it is still running.

Upon receiving CG activation command, the UE should stop the CG retransmission timer for HARQ processes configured for the CG.

No special handling for HARQ process sharing between configured grant and dynamic grants (i.e. follow licensed specifications).

HARQ process id selection is based on UE implementation. Ongoing retransmissions on HARQ processes should be prioritized.

Multiple active CG configurations should be allowed for NR-U. Details are for further study (FFS).

A single LCH can be map to multiple CG configurations.

Multiple LCHs can be map to a single CG configuration.

The multiple configured grants of a single BWP can be explicitly configured to share a common pool of HARQ processes. If HARQ processes are shared, the same CG timer value has to be configured.

The processes with TBs pending for retransmission shall be prioritized over the processes for new transmissions as already agreed for single CG case.

Retransmissions can be done on different CG resources as long as they are with the same transport block size (TBS) with the same HARQ process cgRetransmissionTimer is always configured for NR-U.

For a HARQ process, the associated configuredGrantTimer is only started when the TB using this HARQ process is initially transmitted, and set to the timer value according to the CG configuration used.

The cgRetransmissionTimer for the HARQ process is started and restarted for every transmission attempt of the TB when LBT succeeds, using the timer value according to the CG configuration which is used for the transmission.

For each CG configuration (e.g., ConfiguredGrantConfig IE), there are number of HARQ processes in the HARQ process pool assigned. A separate configuredGrantTimer and cgRetransmissionTimer setting is associated with each CG configuration. A common pool of HARQ processes can be shared between multiple CG configurations. A TB can be retransmitted using the same HARQ process and a different CG grant in another CG configurations if it can give the same TB size (TBS) as the initial transmission.

Additionally, when a TB is initially transmitted with a CG, it is also unclear whether or not a TB repetition can be transmitted using a different CG resource than the initial TB transmission. In the existing 3GPP specifications, for any RV sequence, the repetitions shall be terminated after the earliest occurring one of the four conditions discussed above. Thus, it may occur that a TB with a CG resource can only be repetitively transmitted M times (M<K) due to the CG period P has expired, while the TB is still not received successfully by the gNB. In such case, the UE would then have to trigger upper-layer retransmission procedures for the TB, which would lead to additional latency for the corresponding data.

For a UE configured with multiple active CG configurations, in order to make CG-based TB repetitions function correctly and efficiently, the above issues must be addressed.

Accordingly, exemplary embodiments of the present disclosure mitigate, reduce, and/or eliminate these and other exemplary problems, issues, and/or drawbacks by providing a flexible mechanism for handling TB repetitions in case a UE is configured with multiple active CG configurations. In general, the UE is allowed to use multiple CGs/resources to perform repetitions for a single TB, which was initially transmitted using a CG supporting TB repetition. In addition, these embodiments also provide mechanisms for handle timers (e.g., configuredGrantTimer and cgRetransmissionTimer) for a HARQ process when TB repetition is enabled.

These exemplary embodiments can provide various exemplary advantages and/or benefits when employed in UEs and wireless networks. For example, such embodiments can improve flexibility of handling configured resources. In addition, such embodiments can improve utilization of configured resources in view of quality-of-service (QoS) requirements (e.g., latency and/or reliability). In addition, such embodiments can facilitate better satisfaction of various QoS requirements of different services that share the same configured resource(s).

Although embodiments are described below in the context of NR-U operation in unlicensed spectrum, such embodiments are not limited to NR-U configurations but are also applicable to other unlicensed operation scenarios such as LTE LAA/eLAA/feLAA/MulteFire. Such embodiments can also be applied to networks operating in licensed spectrum.

In the following, the name configuredGrantTimer (or CGT, for short) is used to represent the timer defined for controlling the maximum number of retransmission attempts of a TB using a configured grant (CG). Likewise, the name cgRetransmissionTimer (or CGRT, for short) is used to represent a timer defined for triggering a UE's autonomous retransmission of a TB using a CG. It should be understood that these names are chosen as examples, and timers with the same or similar functionality may be given and/or referred to by different names, initials, and/or acronyms.

In some embodiments, when a UE is configured with multiple active CG configurations (e.g., multiple ConfiguredGrantConfig IEs), every LCH associated with the UE may be mapped to zero, one, or a plurality of CG configurations.

During a CG transmission occasion (i.e., with a CG) associated with a CG configuration supporting TB repetition (e.g., with parameters repK and repK-RV in the ConfiguredGrantConfig IE), if the CG resource is used for a new transmission, the UE selects data from the set of LCHs mapped to the particular CG configuration to build the TB. If the ConfiguredGrantConfig is not restricted to certain LCHs, the UE selects data from any available LCH to build the TB. The UE then starts the CGT for the associated HARQ process immediately after the TB is initially transmitted at the PHY layer. After the TB has been initially transmitted, the UE transmits a subsequent TB repetition using a CG selected based on at least one of following options (i.e., individually or in combination):

1. The UE chooses a configured resource in the same ConfiguredGrantConfig used for the initial transmission. In other words, TB retransmissions are restricted to the same ConfiguredGrantConfig as used for the initial transmission of the same TB.
2. The UE chooses a configured resource that is earliest in time and is associated with one of the following:
   a. A ConfiguredGrantConfig that allows transmission of the TB. In other words, according to the mapping relation between LCHs and CG configurations, the LCHs that have been multiplexed into the TB are allowed to use the configured resource.
   b. Any ConfiguredGrantConfig provided to the UE. According to the mapping relation between LCHs and CG configurations, there may be a LCH that has been multiplexed into the TB but is not allowed to use the configured resource for a TB repetition. In this case, the UE doesn't check the mapping relation between LCHs and CG configurations for the TB repetition, because the mapping relation is only applicable to the initial transmission.
3. The UE chooses a configured resource not based on a time the configured resource becomes available, but rather according to other conditions such as:
   a. A configured resource that can achieve highest transmission reliability, or
   b. A configured resource that provides shortest transmission delay.
   Either of options 3a and 3b can be combined with the conditions recited in either of options 2a and 2b, above.

In some embodiments, for a subsequent TB repetition, the UE may select a configured resource in a CG configuration that is not configured to support TB repetitions (i.e., repK=1 in the ConfiguredGrantConfig).

In some embodiments, the selection of the configured resource (e.g., according to any of the above options) can be further conditioned upon, or limited to, resources supporting the same TB size as the configured resource used for initial transmission of the TB. In other words, CG resources used for transmission of all TB repetitions including the initial transmission provide the same TBS. Alternately, in other embodiments, the selected configured resource may provide a different TB size (e.g., smaller or larger) than the configured resource used for initial transmission of the TB. In such embodiments, the UE performs rate matching to fit the TB repetition into the different size.

In some embodiments, using the selected configured resource, the UE can retransmit the TB using the same HARQ process (i.e., the same HARQ process ID) as the initial transmission of the TB. The UE may choose a configured resource in a CG configuration to which the particular HARQ process ID is configured. In other embodiments, using the selected configured resource, the UE can retransmit the TB using a different HARQ process (i.e., different HARQ process ID) than the initial transmission of the TB. In such case, the UE can copy and/or replicate the TB from a first HARQ process used for the initial transmission to a second HARQ process used for the TB repetition. Subsequently, UE can flush (e.g., delete) the TB from first HARQ process.

In some embodiments, the UE can use an RV sequence associated with the ConfiguredGrantConfig used for initial transmission of the TB, to transmit any subsequent TB repetitions regardless if the TB retransmission uses the same or a different configured resource as the ConfiguredGrantConfig used for the initial TB transmission.

In other embodiments, for every TB initially transmitted based on a CG for which repetition is configured, the UE starts CGT for the associated HARQ process immediately after the TB is initially transmitted at the PHY layer. The UE can start CGRT according to one of the following options:
1. CGRT is started and restarted immediately after every TB repetition is transmitted using a CG. In a first alternative, the UE can set CGRT based on the cgRetransmissionTimer value in the ConfiguredGrantConfig that was used for the initial transmission of the TB. In a second alternative, the UE can set CGRT based on the cgRetransmissionTimer value in the ConfiguredGrantConfig that was used for transmission of the corresponding TB repetition.
2. CGRT is started immediately after the initial TB transmission is transmitted using a CG. The UE can set CGRT based on the cgRetransmissionTimer value in the ConfiguredGrantConfig that was used for the initial transmission of the TB. However, the UE does not restart CGRT after transmission of every subsequent TB repetition.
3. CGRT is started immediately after the last (i.e., final) TB repetition is transmitted using a CG, but CGRT is not started after the initial TB transmission or earlier TB repetitions. In a first alternative, the UE can set CGRT based on the cgRetransmissionTimer value in the ConfiguredGrantConfig that was used for the initial transmission of the TB. In a second alternative, the UE can set CGRT based on the cgRetransmissionTimer value in the ConfiguredGrantConfig that was used for transmission of the last TB repetition.

For any of the above options, CGRT is used to allow the UE to start further autonomous retransmissions after all TB repetitions are transmitted, provided that the following conditions are met:
1. The UE has not received HARQ A/N for the associated HARQ process;
2. The UE has not received any new grant for a new transmission using the same HARQ process; and
3. CGT is still running.

Likewise, for any of the above options, if CGRT expires before the UE has finished transmitting TB repetitions, the UE can restart CGRT after transmission of the last TB repetition. Since the UE is allowed to transmit TB repetitions while CGRT is running, restarting CGRT enables the UE to finish transmitting TB repetitions, so long as CGT is still running.

In other embodiments, when the UE attempts to transmit a TB repetition using a selected resource associated with a CG configuration, the UE can handle CGT according to one of the following options:
1. CGT is kept running without any update or interruption; or
2. CGT is restarted and set to a configuredGrantTimer value in the ConfiguredGrantConfig associated with the selected resource, minus the elapsed time since the initial TB transmission.

In some embodiments, the UE can handle CGT according to the above options regardless if a LBT operation for the repetition is successful or unsuccessful.

These embodiments described above can be further illustrated with reference to FIGS. 6-7 which depict exemplary methods and/or procedures performed by a user equipment (UE, e.g., wireless device) and a network node (e.g., base station, gNB, eNB, etc.), respectively. Put differently, various features of the operations described below correspond to various embodiments described above.

Figure 6:
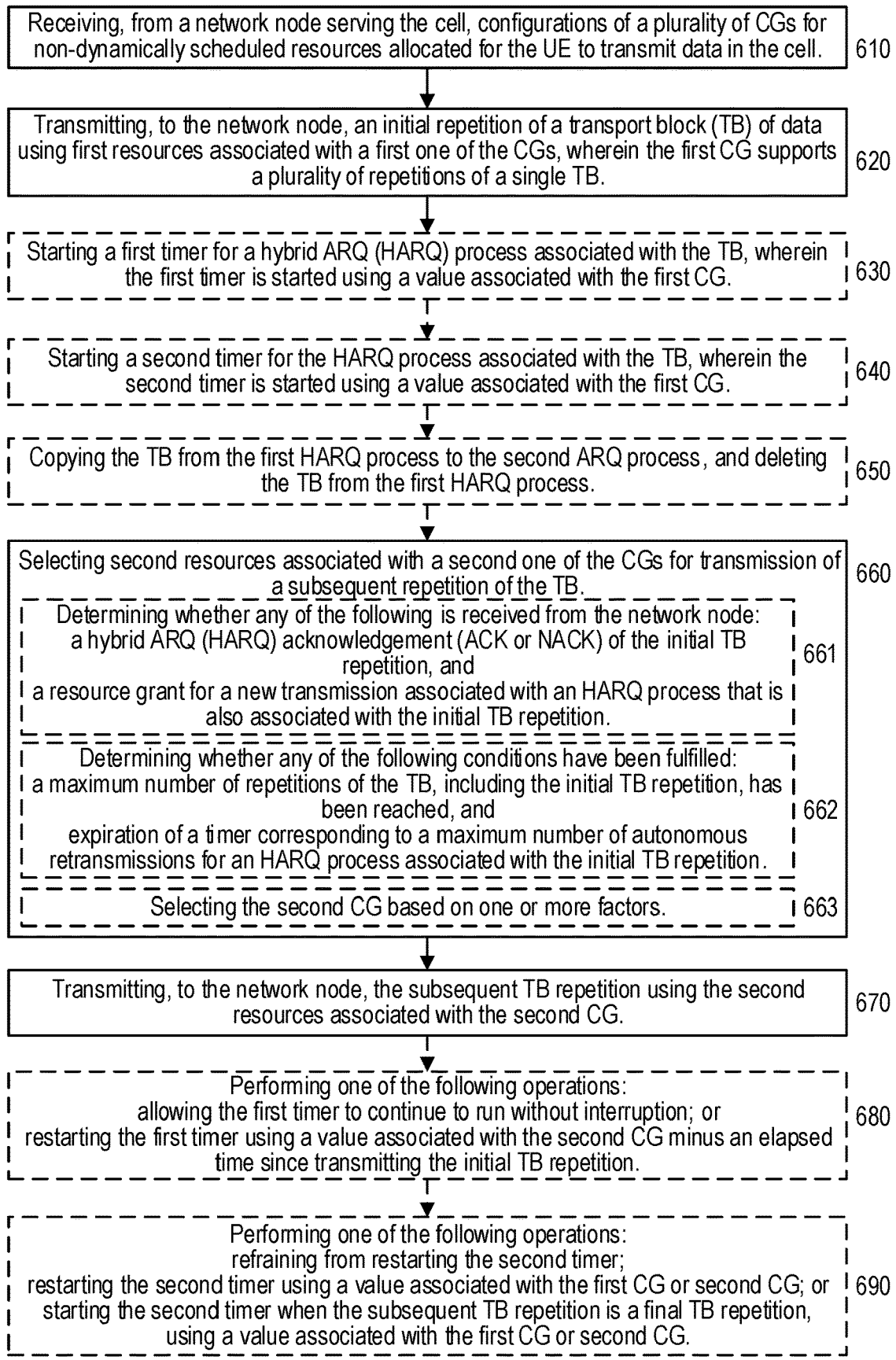
FIG. 6 shows a flow diagram of an exemplary method (e.g., procedure) performed by a user equipment (UE, e.g., wireless device, IoT device, etc.), according to various exemplary embodiments of the present disclosure.

In particular, FIG. 6 is a flow diagram illustrating an exemplary method (e.g., procedure) for transmitting data based on a plurality of configured grants (CGs) of resources (e.g. in a cell) of a wireless network, according to various exemplary embodiments of the present disclosure. The exemplary method shown in FIG. 6 can be performed, for example, by a user equipment (UE, e.g., wireless device, IoT device, MTC device, etc. or component thereof) configured to operate in the wireless network (e.g., NG-RAN, E-UTRAN). Furthermore, the exemplary method shown in FIG. 6 can be used cooperatively with other exemplary methods described herein (e.g., FIG. 7) to provide various exemplary benefits described herein. Although FIG. 6 shows specific blocks in a particular order, the operations of the exemplary method can be performed in a different order than shown and can be combined and/or divided into blocks having different functionality than shown. Optional blocks and/or operations are indicated by dashed lines.

The exemplary method can include the operations of block 610, where the UE can receive, from a network node serving the UE, configurations of a plurality of CGs of resources allocated for the UE to transmit data (to the network node). For example, the configurations of the plurality of CGs can be received as a plurality of ConfiguredGrantConfig IEs (such as shown in FIG. 5), each corresponding to a CG. The CGs are generally for non-dynamically scheduled resources that can provide various benefits for the UE, as discussed in more detail above.

The exemplary method can also include the operations of block 620, where the UE can transmit, to the network node, an initial transmission of a transport block (TB) of data using first resources associated with a first one of the CGs (e.g. within a cell, wherein the network node serves the UE). The first CG can support a plurality of repetitions of a single TB. In some embodiments, the UE can be configured with a plurality of logical channels (LCHs), with each LCH being mapped to one or more of the CGs. In such embodiments, one or more of the LCHs can be multiplexed into the TB (i.e., the TB for which an initial repetition is transmitted in block 620).

In some embodiments, the exemplary method can also include the operations of block 630, where the UE can, in response to transmitting the initial TB transmission (e.g., in block 620), start a first timer for a hybrid ARQ (HARQ)

process associated with the TB. The first timer can be started using a value associated with the first CG. For example, the first timer can be a configuredGrantTimer and can be started using a corresponding value in the ConfiguredGrantConfig associated with the first CG.

In some embodiments, the exemplary method can also include the operations of block 640, where the UE can, in response to transmitting the initial TB transmission (e.g., in block 620), start a second timer for the HARQ process associated with the TB. The second timer can be started using a value associated with the first CG. For example, the second timer can be a cgRetransmissionTimer and can be started using a corresponding value in the ConfiguredGrant-Config associated with the first CG.

The exemplary method can also include the operations of block 660, where the UE can select second resources associated with a second one of the CGs for transmission of a subsequent repetition of the TB. In various embodiments, the operations of block 660 can include the operations of sub-blocks 661 and/or 662. In sub-block 661, the UE can determine whether any of the following information has been received from the network node:
  a hybrid ARQ (HARQ) acknowledgement (ACK or NACK) of the TB, and/or
  a resource grant for a new transmission associated with an HARQ process that is also associated with the initial TB transmission
In such embodiments, selecting the second resources is based on determining that none of the above information has been received from the network node. Likewise, in sub-block 662, the UE can determine whether any of the following conditions have been fulfilled:
  a maximum number of repetitions of the TB, including the initial TB transmission, has been reached, and/or
  expiration of a timer corresponding to a maximum number of autonomous retransmissions for an HARQ process associated with the initial TB transmission.
In such embodiments, selecting the second resources is based on determining that none of the above conditions have been fulfilled. In some embodiments, the conditions tested by the UE in sub-blocks 661 and 662 can be combined, such that the UE only selects the second resources when it is determined that none of the information has been received (in sub-block 661) and that none of the conditions have been met (in sub-block 662).

In some embodiments, the operations of block 660 can include the operations of sub-block 663, where the UE can select the second CG based on one or more of the following rules and/or conditions:
  the same as the first CG;
  a CG having second resources available earliest in time for the subsequent TB repetition;
  a CG mapped to LCHs that are multiplexed into the TB;
  a CG having second resources that can provide the highest transmission reliability among the plurality of CGs;
  a CG having second resources that can provide the shortest transmission delay among the plurality of CGs;
  a CG having second resources that support a TB size (TBS) used to transmit the initial TB transmission using the first resources; and
  a CG having second resources associated with a HARQ process that is also associated with the initial TB transmission.
In some embodiments, the second resources associated with the second CG do not support a plurality of repetitions of a single TB.

In some embodiments, the initial TB transmission can be associated with a first HARQ process and the subsequent TB repetition can be associated with a second (i.e., different) HARQ process. In such embodiments, the exemplary method can include the operations of block 660, where the UE can copy the TB from the first HARQ process to the second ARQ process (e.g., prior to transmitting the subsequent TB repetition in block 670, below), and subsequently deleting the TB from the first HARQ process.

The exemplary method can also include the operations of block 670, where the UE can transmit, to the network node, the subsequent TB repetition using the second resources associated with the second CG (e.g., as selected in block 660). In some embodiments, the first CG includes a first redundancy version (RV) sequence for a plurality of TB repetitions. In such embodiments, transmitting the subsequent TB repetition (e.g., in block 670) can be further based on the first RV sequence of the first CG.

In some embodiments, the exemplary method can also include the operations of block 680, where the UE can perform one of the following operations in response to transmitting the subsequent TB repetition: allow the first timer to continue to run without interruption, or restart the first timer using a value associated with the second CG minus an elapsed time since transmitting the initial TB transmission. In general, the embodiments including block 680 can also include block 630, in which the UE starts the first timer.

In some embodiments, the exemplary method can also include the operations of block 690, where the UE can perform one of the following operations in response to transmitting the subsequent TB repetition: refrain from restarting the second timer, restart the second timer using a value associated with the second CG, or restart the second timer using a value associated with the first CG. In general, the embodiments including block 690 can also include block 640, in which the UE starts the second timer.

In some embodiments, the UE does not perform the operations of block 640, in which the second timer is started in response to the initial TB transmission. In these embodiments, the operations of block 690, performed in response to transmitting the subsequent TB repetition, can include an additional option. More specifically, when the subsequent TB repetition is a final repetition of the TB, the UE can start the second timer for the HARQ process associated with the TB. For example, the UE can refrain from starting the second timer until after transmission of the final TB repetition. In such case, the UE can start the second timer in block 690 using a value associated with the first CG or with the second CG.

Figure 7:
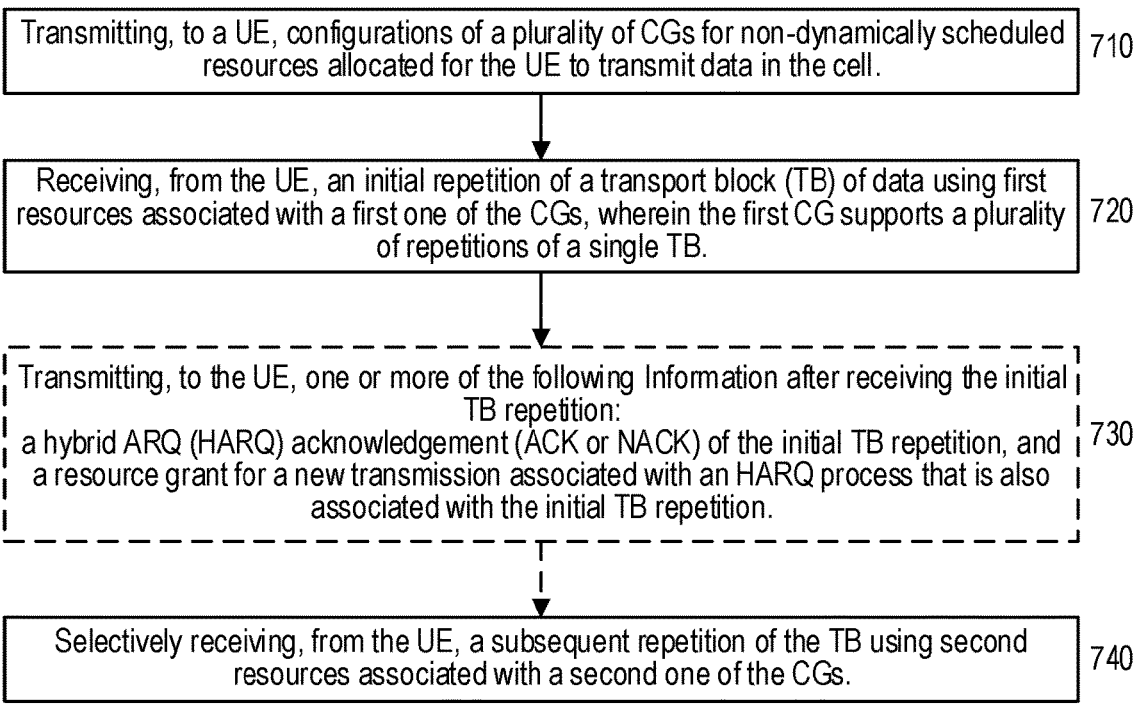
FIG. 7 shows a flow diagram of an exemplary method (e.g., procedure) performed by a network node (e.g., base station, eNB, gNB, CU, DU, etc. or components thereof), according to various exemplary embodiments of the present disclosure.

In addition, FIG. 7 is a flow diagram illustrating an exemplary method (e.g., procedure) for receiving data from a user equipment (UE) based on a plurality of configured grants (CGs) of resources of a wireless network, according to various exemplary embodiments of the present disclosure. The exemplary method shown in FIG. 7 can be performed, for example, by a network node (e.g., base station, eNB, gNB, or components thereof) in the wireless network (e.g., NG-RAN, E-UTRAN). Furthermore, the exemplary method shown in FIG. 7 can be used cooperatively with other exemplary methods described herein (e.g., FIG. 6) to provide various exemplary benefits described herein. Although FIG. 6 shows specific blocks in a particular order, the operations of the exemplary method can be performed in a different order than shown and can be combined and/or divided into blocks having different functionality than shown. Optional blocks and/or operations are indicated by dashed lines.

The exemplary method can include the operations of block 710, where the network node can transmit, to the UE, configurations of a plurality of CGs of resources allocated for the UE to transmit data to the network node. For example, the configurations of the plurality of CGs can be sent as a plurality of ConfiguredGrantConfig IEs (such as shown in FIG. 5), each corresponding to a CG. The CGs are generally for non-dynamically scheduled resources that can provide various benefits for the UE, as discussed in more detail above.

The exemplary method can also include the operations of block 720, where the network node can receive, from the UE, an initial transmission of a transport block (TB) of data using first resources associated with a first one of the CGs. The first CG can support a plurality of repetitions of a single TB. In some embodiments, the UE can be configured with a plurality of logical channels (LCHs), with each LCH being mapped to one or more of the CGs. In such embodiments, one or more of the LCHs can be multiplexed into the TB (i.e., the TB for which an initial repetition is received in block 720).

The exemplary method can also include the operations of block 740, where the network node can selectively receive, from the UE, a subsequent repetition of the TB using second resources associated with a second one of the CGs. In some embodiments, the first CG can include a first redundancy version (RV) sequence for a plurality of TB repetitions. In such embodiments, receiving the subsequent TB repetition (e.g., in block 740) can be further based on the first RV sequence of the first CG.

In some embodiments, the exemplary method can also include the operations of block 730, where the network node can transmit, to the UE, one or more of the following information after receiving the initial TB transmission:
  a hybrid ARQ (HARQ) acknowledgement (ACK or NACK) of the TB, and/or
  a resource grant for a new transmission associated with a HARQ process that is also associated with the initial TB transmission.

In such embodiments, the subsequent TB repetition is not received after transmitting the information (e.g., in block 730) after receiving the initial TB transmission. This operation can be complementary to the UE operations in block 660—including sub-block 662—discussed above. However, in other embodiments, the subsequent TB repetition may be received after transmitting the information after receiving the initial TB transmission. This may occur, for example, if the UE does not receive the transmitted information.

In some embodiments, the second CG (i.e., including the resources in which the subsequent TB repetition was received in block 740) is one of the following:
  the same as the first CG;
  a CG having second resources available earliest in time for the subsequent TB repetition;
  a CG mapped to LCHs that are multiplexed into the TB;
  a CG having second resources that can provide the highest transmission reliability among the plurality of CGs;
  a CG having second resources that can provide the shortest transmission delay among the plurality of CGs;
  a CG having second resources that support a TB size (TBS) used to transmit the initial TB transmission using the first resources; and
  a CG having second resources associated with a HARQ process that is also associated with the initial TB transmission.

In some embodiments, the second resources associated with the second CG do not support a plurality of repetitions of a single TB.

In some embodiments, the initial TB transmission can be associated with a first HARQ process and the subsequent TB repetition can be associated with a second (i.e., different) HARQ process.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 8:
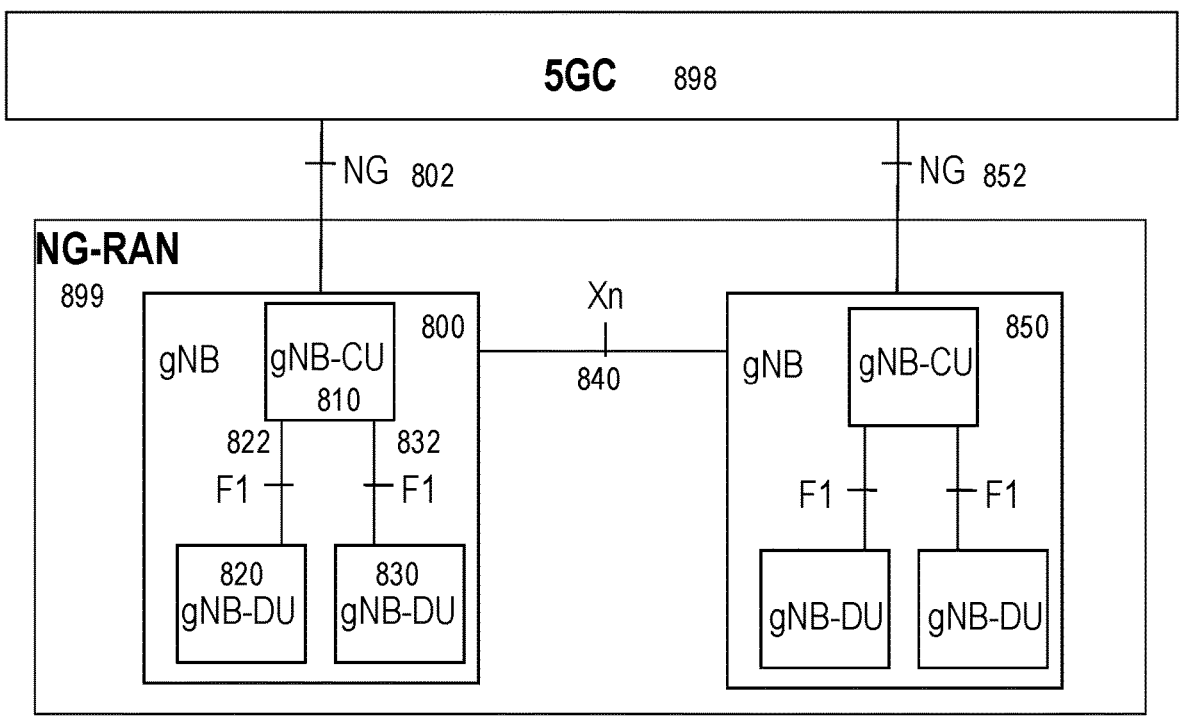
FIG. 8 illustrates a high-level view of a 5G network architecture, according to various exemplary embodiments of the present disclosure.

FIG. 8 illustrates a high-level view of the 5G network architecture, consisting of a Next Generation RAN (NG-RAN) 899 and a 5G Core (5GC) 898. NG-RAN 899 can include a set of gNodeB's (gNBs) connected to the 5GC via one or more NG interfaces, such as gNBs 800, 850 connected via interfaces 802, 852, respectively. In addition, the gNBs can be connected to each other via one or more Xn interfaces, such as Xn interface 840 between gNBs 800 and 850. With respect to the NR interface to UEs, each of the gNBs can support frequency division duplexing (FDD), time division duplexing (TDD), or a combination thereof.

The NG RAN logical nodes shown in FIG. 8 (and described in 3GPP TS 38.401 and 3GPP TR 38.801) include a central (or centralized) unit (CU or gNB-CU) and one or more distributed (or decentralized) units (DU or gNB-DU). For example, gNB 800 in FIG. 8 includes gNB-CU 810 and gNB-DUs 820 and 830. CUs (e.g., gNB-CU 810) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 822 and 832 shown in FIG. 8. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Figure 9:
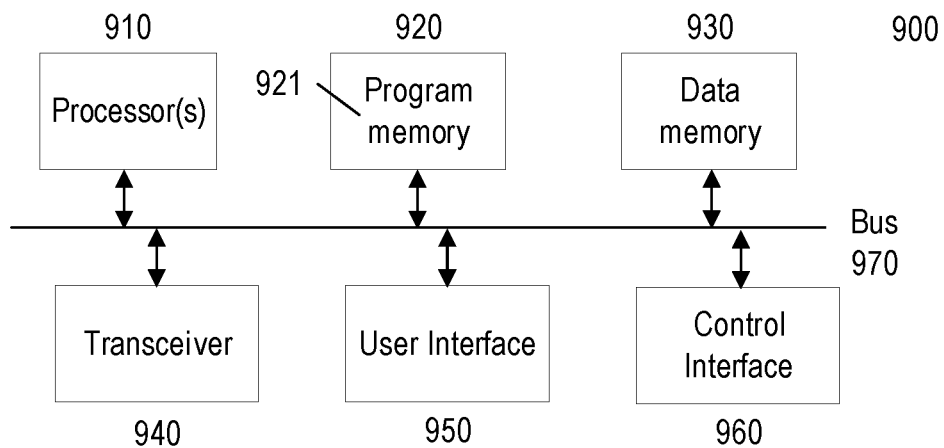
FIG. 9 is a block diagram of an exemplary wireless device or UE, according to various exemplary embodiments of the present disclosure.

FIG. 9 shows a block diagram of an exemplary wireless device or user equipment (UE) 900 (hereinafter referred to as "UE 900") according to various embodiments of the present disclosure, including those described above with reference to other figures. For example, UE 900 can be configured by execution of instructions, stored on a computer-readable medium, to perform operations corresponding to one or more of the exemplary methods described herein.

UE 900 can include a processor 910 (also referred to as "processing circuitry") that can be operably connected to a program memory 920 and/or a data memory 930 via a bus 970 that can comprise parallel address and data buses, serial ports, or other methods and/or structures known to those of ordinary skill in the art. Program memory 920 can store software code, programs, and/or instructions (collectively shown as computer program product 921 in FIG. 9) that, when executed by processor 910, can configure and/or facilitate UE 900 to perform various operations, including operations corresponding to various exemplary methods described herein. As part of or in addition to such operations, execution of such instructions can configure and/or facilitate UE 900 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 940, user interface 950, and/or control interface 960.

As another example, processor 910 can execute program code stored in program memory 920 that corresponds to MAC, RLC, PDCP, and RRC layer protocols standardized by 3GPP (e.g., for NR and/or LTE). As a further example, processor 910 can execute program code stored in program memory 920 that, together with radio transceiver 940, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 910 can execute program code stored in program memory 920 that, together with radio transceiver 940, implements device-to-device (D2D) communications with other compatible devices and/or UEs.

Program memory 920 can also include software code executed by processor 910 to control the functions of UE 900, including configuring and controlling various components such as radio transceiver 940, user interface 950, and/or control interface 960. Program memory 920 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 920 can comprise an external storage arrangement (not shown) remote from UE 900, from which the instructions can be downloaded into program memory 920 located within or removably coupled to UE 900, so as to enable execution of such instructions.

Data memory 930 can include memory area for processor 910 to store variables used in protocols, configuration, control, and other functions of UE 900, including operations corresponding to, or comprising, any of the exemplary methods described herein. Moreover, program memory 920 and/or data memory 930 can include non-volatile memory (e.g., flash memory), volatile memory (e.g., static or dynamic RAM), or a combination thereof. Furthermore, data memory 930 can comprise a memory slot by which removable memory cards in one or more formats (e.g., SD Card, Memory Stick, Compact Flash, etc.) can be inserted and removed.

Persons of ordinary skill will recognize that processor 910 can include multiple individual processors (including, e.g., multi-core processors), each of which implements a portion of the functionality described above. In such cases, multiple individual processors can be commonly connected to program memory 920 and data memory 930 or individually connected to multiple individual program memories and or data memories. More generally, persons of ordinary skill in the art will recognize that various protocols and other functions of UE 900 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 940 can include radio-frequency transmitter and/or receiver functionality that facilitates the UE 900 to communicate with other equipment supporting like wireless communication standards and/or protocols. In some exemplary embodiments, the radio transceiver 940 includes one or more transmitters and one or more receivers that enable UE 900 to communicate according to various protocols and/or methods proposed for standardization by 3GPP and/or other standards bodies. For example, such functionality can operate cooperatively with processor 910 to implement a PHY layer based on OFDM, OFDMA, and/or SC-FDMA technologies, such as described herein with respect to other figures.

In some exemplary embodiments, radio transceiver 940 includes one or more transmitters and one or more receivers that can facilitate the UE 900 to communicate with various LTE, LTE-Advanced (LTE-A), and/or NR networks according to standards promulgated by 3GPP. In some exemplary embodiments of the present disclosure, the radio transceiver 940 includes circuitry, firmware, etc. necessary for the UE 900 to communicate with various NR, NR-U, LTE, LTE-A, LTE-LAA, UMTS, and/or GSM/EDGE networks, also according to 3GPP standards. In some embodiments, radio transceiver 940 can include circuitry supporting D2D communications between UE 900 and other compatible devices.

In some embodiments, radio transceiver 940 includes circuitry, firmware, etc. necessary for the UE 900 to communicate with various CDMA2000 networks, according to 3GPP2 standards. In some embodiments, the radio transceiver 940 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 940 can include a transceiver that is capable of wired communication, such as by using IEEE 802.3 Ethernet technology. The functionality particular to each of these embodiments can be coupled with and/or controlled by other circuitry in the UE 900, such as the processor 910 executing program code stored in program memory 920 in conjunction with, and/or supported by, data memory 930.

User interface 950 can take various forms depending on the particular embodiment of UE 900, or can be absent from UE 900 entirely. In some embodiments, user interface 950 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 900 can comprise a tablet computing device including a larger touchscreen display. In such embodiments, one or more of the mechanical features of the user interface 950 can be replaced by comparable or functionally equivalent virtual user interface features (e.g., virtual keypad, virtual buttons, etc.) implemented using the touchscreen display, as familiar to persons of ordinary skill in the art. In other embodiments, the UE 900 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 900 having a touch screen display are capable of receiving user inputs, such as inputs related to exemplary methods described herein or otherwise known to persons of ordinary skill.

In some embodiments, UE 900 can include an orientation sensor, which can be used in various ways by features and functions of UE 900. For example, the UE 900 can use outputs of the orientation sensor to determine when a user has changed the physical orientation of the UE 900's touch screen display. An indication signal from the orientation sensor can be available to any application program executing on the UE 900, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 960 of the UE 900 can take various forms depending on the particular exemplary embodiment of UE 900 and of the particular interface requirements of other devices that the UE 900 is intended to communicate with and/or control. For example, the control interface 960 can comprise an RS-232 interface, a USB interface, an HDMI interface, a Bluetooth interface, an IEEE ("Firewire") interface, an I$^2$C interface, a PCMCIA interface, or the like. In some exemplary embodiments of the present disclosure, control interface 960 can comprise an IEEE 802.3 Ethernet interface such as described above. In some exemplary embodiments of the present disclosure, the control interface 960 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 900 can comprise more functionality than is shown in FIG. 9 including, for example, a video and/or still-image camera, microphone, media player and/or recorder, etc. Moreover, radio transceiver 940 can include circuitry necessary to communicate using additional radio-frequency communication standards including Bluetooth, GPS, and/or others. Moreover, the processor 910 can execute software code stored in the program memory 920 to control such additional functionality. For example, directional velocity and/or position estimates output from a GPS receiver can be available to any application program executing on the UE 900, including any program code corresponding to and/or embodying any exemplary embodiments (e.g., of methods) described herein.

Figure 10:
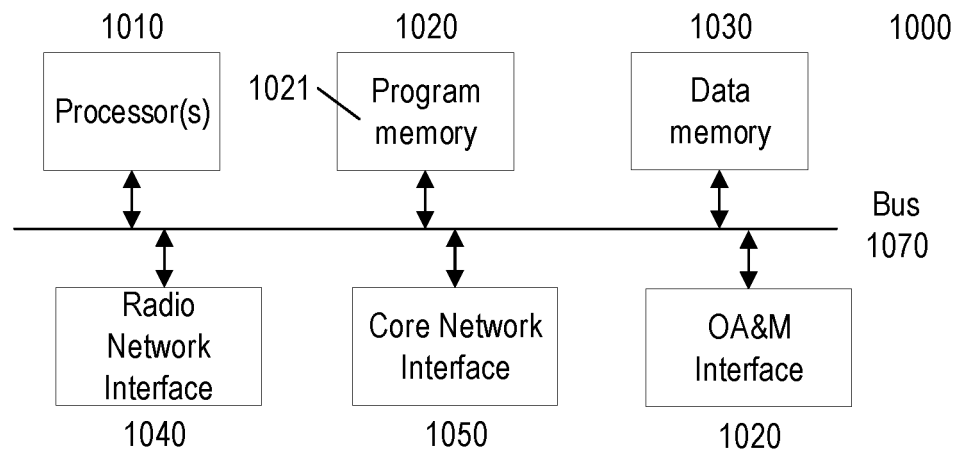
FIG. 10 is a block diagram of an exemplary network node according to various exemplary embodiments of the present disclosure.

FIG. 10 shows a block diagram of an exemplary network node 1000 according to various embodiments of the present disclosure, including those described above with reference to other figures. For example, exemplary network node 1000 can be configured by execution of instructions, stored on a computer-readable medium, to perform operations corresponding to one or more of the exemplary methods described herein. In some exemplary embodiments, network node 1000 can comprise a base station, eNB, gNB, or one or more components thereof. For example, network node 1000 can be configured as a central unit (CU) and one or more distributed units (DUs) according to NR gNB architectures specified by 3GPP. More generally, the functionally of network node 1000 can be distributed across various physical devices and/or functional units, modules, etc.

Network node 1000 can include processor 1010 (also referred to as "processing circuitry") that is operably connected to program memory 1020 and data memory 1030 via bus 1070, which can include parallel address and data buses, serial ports, or other methods and/or structures known to those of ordinary skill in the art.

Program memory 1020 can store software code, programs, and/or instructions (collectively shown as computer program product 1021 in FIG. 10) that, when executed by processor 1010, can configure and/or facilitate network node 1000 to perform various operations, including operations corresponding to various exemplary methods described herein. As part of and/or in addition to such operations, program memory 1020 can also include software code executed by processor 1010 that can configure and/or facilitate network node 1000 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1040 and/or core network interface 1050. By way of example, core network interface 1050 can comprise the S1 or NG interface and radio network interface 1040 can comprise the Uu interface, as standardized by 3GPP. Program memory 1020 can also comprise software code executed by processor 1010 to control the functions of network node 1000, including configuring and controlling various components such as radio network interface 1040 and core network interface 1050.

Data memory 1030 can comprise memory area for processor 1010 to store variables used in protocols, configuration, control, and other functions of network node 1000. As such, program memory 1020 and data memory 1030 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1010 can include multiple individual processors (not shown), each of which implements a portion of the functionality described above. In such case, multiple individual processors may be commonly connected to program memory 1020 and data memory 1030 or individually connected to multiple individual program memories and/or data memories. More generally, persons of ordinary skill will recognize that various protocols and other functions of network node 1000 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1040 can comprise transmitters, receivers, signal processors, ASICs, antennas, beamforming units, and other circuitry that enables network node 1000 to communicate with other equipment such as, in some embodiments, a plurality of compatible user equipment (UE). In some embodiments, interface 1040 can also enable network node 1000 to communicate with compatible satellites of a satellite communication network. In some exemplary embodiments, radio network interface 1040 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1040. According to further exemplary embodiments of the present disclosure, the radio network interface 1040 can comprise a PHY layer based on OFDM, OFDMA, and/or SC-FDMA technologies. In some embodiments, the functionality of such a PHY layer can be provided cooperatively by radio network interface 1040 and processor 1010 (including program code in memory 1020).

Core network interface 1050 can comprise transmitters, receivers, and other circuitry that enables network node 1000 to communicate with other equipment in a core network such as, in some embodiments, circuit-switched (CS) and/or packet-switched Core (PS) networks. In some embodiments, core network interface 1050 can comprise the S1 interface standardized by 3GPP. In some embodiments, core network interface 1050 can comprise the NG interface standardized by 3GPP. In some exemplary embodiments, core network interface 1050 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1050 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1000 can include hardware and/or software that configures and/or facilitates network node 1000 to communicate with other network nodes in a RAN, such as with other eNBs, gNBs, ng-eNBs, en-gNBs, IAB nodes, etc. Such hardware and/or software can be part of radio network interface 1040 and/or core network interface 1050, or it can be a separate functional unit (not shown). For example, such hardware and/or software can configure and/or facilitate network node 1000 to communicate with other RAN nodes via the X2 or Xn interfaces, as standardized by 3GPP.

OA&M interface 1060 can comprise transmitters, receivers, and other circuitry that enables network node 1000 to communicate with external networks, computers, databases, and the like for purposes of operations, administration, and maintenance of network node 1000 or other network equipment operably connected thereto. Lower layers of OA&M interface 1060 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1040, core network interface 1050, and OA&M interface 1060 may be multiplexed together on a single physical interface, such as the examples listed above.

Figure 11:
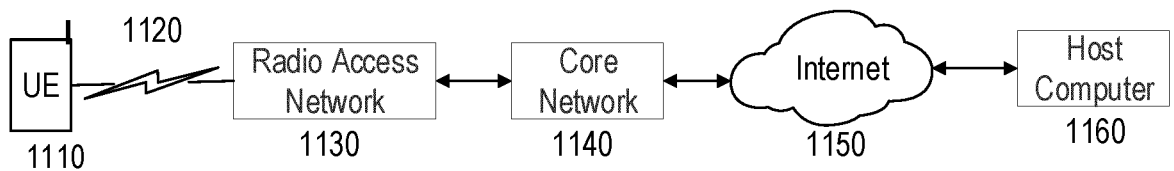
FIG. 11 is a block diagram of an exemplary network configured to provide over-the-top (OTT) data services between a host computer and a UE, according to various exemplary embodiments of the present disclosure.

FIG. 11 is a block diagram of an exemplary communication network configured to provide over-the-top (OTT) data services between a host computer and a user equipment (UE), according to one or more exemplary embodiments of the present disclosure. UE 1110 can communicate with radio access network (RAN) 1130 over radio interface 1120, which can be based on protocols described above including, e.g., LTE, LTE-A, and 5G/NR. For example, UE 1110 can be configured and/or arranged as shown in other figures discussed above.

RAN 1130 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1130 can cooperatively operate using licensed and unlicensed spectrum. In some embodiments, RAN 1130 can include, or be capable of communication with, one or more satellites comprising a satellite access network.

RAN 1130 can further communicate with core network 1140 according to various protocols and interfaces described above. For example, one or more apparatus (e.g., base stations, eNBs, gNBs, etc.) comprising RAN 1130 can communicate to core network 1140 via core network interface 1150 described above. In some exemplary embodiments, RAN 1130 and core network 1140 can be configured and/or arranged as shown in other figures discussed above. For example, eNBs comprising an E-UTRAN 1130 can communicate with an EPC core network 1140 via an S1 interface. As another example, gNBs and ng-eNBs comprising an NG-RAN 1130 can communicate with a 5GC core network 1130 via an NG interface.

Core network 1140 can further communicate with an external packet data network, illustrated in FIG. 11 as Internet 1150, according to various protocols and interfaces known to persons of ordinary skill in the art. Many other devices and/or networks can also connect to and communicate via Internet 1150, such as exemplary host computer 1160. In some exemplary embodiments, host computer 1160 can communicate with UE 1110 using Internet 1150, core network 1140, and RAN 1130 as intermediaries. Host computer 1160 can be a server (e.g., an application server) under ownership and/or control of a service provider. Host computer 1160 can be operated by the OTT service provider or by another entity on the service provider's behalf.

For example, host computer 1160 can provide an over-the-top (OTT) packet data service to UE 1110 using facilities of core network 1140 and RAN 1130, which can be unaware of the routing of an outgoing/incoming communication to/from host computer 1160. Similarly, host computer 1160 can be unaware of routing of a transmission from the host computer to the UE, e.g., the routing of the transmission through RAN 1130. Various OTT services can be provided using the exemplary configuration shown in FIG. 11 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 11 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide enhanced techniques for selecting beams for random during unlicensed (e.g., NR-U) operation when directional listen-before-talk (LBT) is used by a UE. Such embodiments can cause the UE to avoid being stalled on a serving beam due to occurrence of consistent UL LBT failures, and can provide a way for a UE to quickly recover from consistent LBT failures on a serving beam. Furthermore, such embodiments can mitigate and/or reduce interruptions to UE services due to LBT failures, thereby facilitating use of services (e.g., eMBB, URLLC, etc.) on unlicensed spectrum. When used in NR UEs (e.g., UE 1110) and gNBs (e.g., gNBs comprising RAN 1130), exemplary embodiments described herein can provide various improvements, benefits, and/or advantages that facilitate and/or improve the use of data services (e.g., URLLC) in unlicensed spectrum. As a consequence, this improves the performance of these services as experienced by OTT service providers and end-users, including more consistent data throughout and lower latency without excessive UE power consumption or other reductions in user experience.

The invention claimed is:

1. A method performed by a user equipment (UE) for transmitting data based on a plurality of configured grants (CGs) of resources of a wireless network, the method comprising:
   receiving, from a network node, configurations of a plurality of CGs of resources allocated for the UE to transmit the data;
   transmitting, to the network node, an initial transmission of a transport block (TB) of the data using first resources associated with a first CG of the plurality of CGs, wherein the first CG supports a plurality of repetitions of a single TB, wherein the UE is configured with a plurality of logical channels (LCHs), each LCH is mapped to one or more of the CGs, and one or more of the LCHs are multiplexed into the TB;
   selecting second resources associated with a second CG of the plurality of CGs for transmission of a subsequent repetition of the TB; and
   transmitting, to the network node, the subsequent repetition of the TB using the second resources associated with the second CG.

2. The method of claim 1, wherein selecting the second resources for transmission of a subsequent repetition of the TB comprises:
   determining whether any of has been received from the network node:
      a hybrid ARQ (HARQ) acknowledgement (ACK or NACK) of the TB, and
      a resource grant for a new transmission associated with an HARQ process that is also associated with the initial transmission of the TB; and
   selecting the second resources based on determining that none of the information has been received from the network node.

3. The method of claim 1, wherein selecting the second resources for transmission of the subsequent repetition of the TB comprises:
   determining whether any of have been fulfilled:
      a maximum number of repetitions of the TB, including the initial transmission of the TB, has been reached, and
      expiration of a timer corresponding to a maximum number of autonomous retransmissions for an HARQ process associated with the initial transmission of the TB; and
   selecting the second resources based on determining that none of have been fulfilled.

4. The method of claim 1, wherein selecting the second resources associated with the second CG comprises selecting the second CG based on one or more of:
   the same as the first CG;
   a CG having second resources available earliest in time for the subsequent repetition of the TB;
   a CG mapped to the LCHs that are multiplexed into the TB;
   a CG having second resources that provide a highest transmission reliability among the plurality of CGs;
   a CG having second resources that provide a shortest transmission delay among the plurality of CGs;
   a CG having second resources that support a TB size (TBS) used for the initial transmission of the TB using the first resources; and
   a CG having second resources associated with a HARQ process that is also associated with the initial transmission of the TB.

5. The method of claim 1, wherein the second resources associated with the second CG do not support a plurality of repetitions of a single TB.

6. The method of claim 1, wherein:
   the initial transmission of the TB is associated with a first HARQ process;
   the subsequent repetition of the TB is associated with a second HARQ process; and
   the method further comprises:
      copying the TB from the first HARQ process to the second ARQ process prior to transmitting the subsequent repetition of the TB; and
      subsequently deleting the TB from the first HARQ process.

7. The method of claim 1, wherein:
   the first CG includes a first redundancy version (RV) sequence for a plurality of TB repetitions; and
   transmitting the subsequent repetition of the TB using the second resources associated with the second CG is further based on the first RV sequence of the first CG.

8. The method of claim 1, further comprising, in response to transmitting the initial transmission of the TB, starting a first timer for a hybrid ARQ (HARQ) process associated with the TB, wherein the first timer is started using a value associated with the first CG.

9. The method of claim 8, further comprising, in response to transmitting the subsequent repetition of the TB, performing one of the following operations:
   allowing the first timer to continue to run without interruption; or
   restarting the first timer using a value associated with the second CG minus an elapsed time since transmitting the initial transmission of the TB.

10. The method of claim 8, further comprising, in response to transmitting the initial transmission of the TB, starting a second timer for the HARQ process associated with the TB, wherein the second timer is started using a value associated with the first CG.

11. The method of claim 10, further comprising, in response to transmitting the subsequent repetition of the TB, performing one of the following operations:
   refraining from restarting the second timer;
   restarting the second timer using a value associated with the second CG; or
   restarting the second timer using a value associated with the first CG.

12. The method of claim 8, further comprising, in response to transmitting the subsequent repetition of the TB and when the subsequent repetition of the TB is a final repetition of the TB, starting a second timer for the HARQ process associated with the TB, wherein the second timer is started using a value associated with the first CG or with the second CG.

13. A method performed by a network node of a wireless network for receiving data from a user equipment (UE) based on a plurality of configured grants (CGs) of resources, the method comprising:
   transmitting, to the UE, configurations of a plurality of CGs of resources allocated for the UE to transmit the data;
   receiving, from the UE, an initial transmission of a transport block (TB) of data using first resources associated with a first CG of the plurality of CGs, wherein the first CG supports a plurality of repetitions of a single TB, wherein the UE is configured with a plurality of logical channels (LCHs), each LCH is mapped to one or more of the CGs, and one or more of the LCHs are multiplexed into the TB; and
   selectively receiving, from the UE, a subsequent repetition of the TB using second resources associated with a second CG of the plurality of CGs.

14. The method of claim 13, further comprising transmitting, to the UE, one or more of after receiving the initial transmission of the TB:
   a hybrid ARQ (HARQ) acknowledgement (ACK or NACK) of the TB, and
   a resource grant for a new transmission associated with a HARQ process that is also associated with the initial transmission of the TB.

15. The method of claim 14, wherein selectively receiving a subsequent repetition of the TB comprises receiving no subsequent repetition of the TB repetition after transmitting the information to the UE.

16. The method of claim 13, wherein the second CG is one of:
   the first CG;
   a CG having second resources available earliest in time for the subsequent repetition of the TB;
   a CG mapped to the LCHs that are multiplexed into the TB;
   a CG having second resources that provide a highest transmission reliability among the plurality of CGs;
   a CG having second resources that provide a shortest transmission delay among the plurality of CGs;
   a CG having second resources that support a TB size (TBS) used to transmit the initial transmission of the TB using the first resources; and
   a CG having second resources associated with a HARQ process that is also associated with the initial transmission of the TB.

17. The method of claim 13, wherein the second resources associated with the second CG do not support a plurality of repetitions of a single TB.

18. The method of claim 13, wherein:
   the initial transmission of the TB is associated with a first HARQ process; and
   the subsequent repetition of the TB is associated with a second HARQ process.

19. The method of claim 13, wherein:
   the first CG includes a first redundancy version (RV) sequence for a plurality of TB repetitions; and
   selectively receiving a subsequent repetition of the TB comprises receiving the subsequent repetition of the TB using the second resources associated with the second CG and the first RV sequence of the first CG.

20. A user equipment (UE) configured to transmit data using a plurality of configured grants (CGs) of resources in a wireless network, the UE comprising:
   radio transceiver circuitry configured to communicate with a network node serving the cell; and
   processing circuitry operatively coupled to the radio transceiver circuitry, whereby the processing circuitry and the radio transceiver circuitry are configured to perform operations corresponding to the method of claim 1.

21. A network node configured to operate in a wireless network and to receive data from a user equipment (UE) using a plurality of configured grants (CGs) of resources of the wireless network, the network node comprising:
   radio network interface circuitry configured to communicate with the UE; and
   processing circuitry operatively coupled to the radio network interface circuitry, whereby the processing circuitry and the radio network interface circuitry are configured to perform operations corresponding to the method of claim 13.

\* \* \* \* \*